US009380747B2

(12) United States Patent
Sasaki et al.

(10) Patent No.: US 9,380,747 B2
(45) Date of Patent: Jul. 5, 2016

(54) METHOD FOR SELECTING MARKER FOR DIAGNOSIS OF NUTRITIONAL STATUS OF PLANT, METHOD FOR DIAGNOSING NUTRITIONAL STATUS OF PLANT, AND METHOD FOR DETERMINING GROWTH STATUS

(75) Inventors: Shinya Sasaki, Kameyama (JP); Shigeru Sato, Kameyama (JP)

(73) Assignee: OJI HOLDINGS CORPORATION, Tokyo (JP)

( * ) Notice: Subject to any disclaimer, the term of this patent is extended or adjusted under 35 U.S.C. 154(b) by 1085 days.

(21) Appl. No.: 13/393,275

(22) PCT Filed: May 26, 2010

(86) PCT No.: PCT/JP2010/058868
§ 371 (c)(1),
(2), (4) Date: Feb. 29, 2012

(87) PCT Pub. No.: WO2011/024525
PCT Pub. Date: Mar. 3, 2011

(65) Prior Publication Data
US 2012/0156692 A1    Jun. 21, 2012

(30) Foreign Application Priority Data

Aug. 31, 2009  (JP) ................................ 2009-200839

(51) Int. Cl.
*G01N 30/02* (2006.01)
*A01G 7/00* (2006.01)

(52) U.S. Cl.
CPC ....................... *A01G 7/00* (2013.01)

(58) Field of Classification Search
None
See application file for complete search history.

(56) References Cited

U.S. PATENT DOCUMENTS

2008/0155706 A1* 6/2008 Riechmann et al. .......... 800/260

FOREIGN PATENT DOCUMENTS

| JP | 9-262027 A | 10/1997 |
|---|---|---|
| JP | 11-332376 A | 12/1999 |
| JP | 2000-83477 A | 3/2000 |
| JP | 2001-318053 A | 11/2001 |
| JP | 2008-271952 A | 11/2008 |

OTHER PUBLICATIONS

Urbanczyk-Wochniak et al., Journal of Experimental Botany, Jan. 2005, vol. 56, No. 410, pp. 309-321.*
Kovacik et al., Acta Physiologiae Plantarum, vol. 28, No. 2, pp. 159-164, 2006.*
Ewa Urbanczyk-Wochniak, et al., Metabolic profiling reveals altered nitrogen nutrient regimes have diverse effect on the metabolism of hydroponically-grown tomato (*Solanum lycopersicum*) plants, Journal of Experimental Botany, vol. 56, No. 41.0, Making Sense of the Metabolome Special Issue, pp. 309-321, Jan. 2005 (13 pages).
Christian Bölling, et al., "Metabolite Profiling of *Chlamydomonas reinhardtii* under Nutrient Deprivation", Plant Physiology, vol. 139, pp. 1995-2005, Dec. 2005 (11 pages).
Masami Yokota Hirai, et al., "Integration of transcriptomics and metabolomics for understanding of global responses to nutritional stresses in *Arabidopsis thaliana*," Proceedings of the National Academy of Sciences, vol. 101, No. 27, Jul. 6, 2004, pp. 10205-10210 (6 pages).
Scott A. Harding, et al., "Functional genomics analysis of foliar condensed tannin and phenolic glycoside regulation in natural cottonwood hybrids", Tree Physiology, vol. 25, pp. 1475-1486, 2005 (12 pages).
Patent Examination Report No. 1, dated Jul. 26, 2013, issued by Australian Intellectual Property Office in a corresponding Australian Patent Application No. 2010287885 (14 pages).
Communication (Office Action) dated Apr. 9, 2013 issued by the Japanese Patent Office in related Japanese Patent Application No. JP 2011-528684 (3 pages).
Keiki Okazaki, "Analysis of the Effects of Nitrogen as a Nutrient on Metabolic Profiled," Nov. 25, 2007, Journal of Bioscience and Bioengineering, vol. 83; The Society for Biotechnology, Japan (in Japanese with English Translation) (7 pages).
Keiki Okazaki, "Analysis of the Effects of Nitrogen as a Nutrient on Metabolic Profiled," Nov. 25, 2007, Journal of Bioscience and Bioengineering, vol. 85; The Society for Biotechnology, Japan (in Japanese with English Translation) (7 pages).

* cited by examiner

*Primary Examiner* — Phuong Bui
(74) *Attorney, Agent, or Firm* — Lucas & Mercanti, LLP.

(57) ABSTRACT

The present invention provides a method for selecting a marker for diagnosis of the nutritional status capable of reflecting the status of a particular nutrient in a plant without being influenced by various stresses in environmental factors, etc., and a method for diagnosing the status of a particular nutrient in a plant using a marker for diagnosis of the nutritional status selected by the method. A metabolite quantitatively changed depending on only the amount of a particular nutrient in a plant is selected as a marker for diagnosis of the nutritional status reflecting the status of the nutrient in the plant.

8 Claims, 17 Drawing Sheets

Fig. 1

| Diagnostic pattern group | 1 | 2 | 3 |
|---|---|---|---|
| Diagnosis (on 1st month) | Hydroponic solution I | Hydroponic solution I | Hydroponic solution II |
| Diagnosis (on 2nd month) | Hydroponic solution I | Hydroponic solution II | Hydroponic solution II |
| The number of applicable individuals | 6 | 8 | 7 |
| Group from which individuals were derived | All A | A:B=1:7 | All C |

Mass No. 29
+MSMS of 523.4 (Gain of 422.4)

Mass No. 46
+MSMS of 537.4 (Gain of 436.4)

Mass No. 63
+MSMS of 549.2 (Gain of 448.2)

Mass No. 69
+MSMS of 543.4 (Gain of 442.4)

Mass No. 110
+MSMS of 609.4 (Gain of 508.4)

Mass No. 140
+MSMS of 535.3 (Gain of 434.3)

Fig. 4

| Diagnostic pattern group | 1 | 3 |
|---|---|---|
| Diagnosis (on 1st month) | Hydroponic solution I | Hydroponic solution II |
| Diagnosis (on 2nd month) | Hydroponic solution I | Hydroponic solution II |
| The number of applicable individuals | 3 | 3 |
| Group from which individuals were derived | All A' | All B' |

Fig. 6

| Diagnostic pattern group | 1 | 2 | 3 |
|---|---|---|---|
| Diagnosis (on 1st month) | Hydroponic solution I | Hydroponic solution I | Hydroponic solution III |
| Diagnosis (on 2nd month) | Hydroponic solution I | Hydroponic solution III | Hydroponic solution III |
| The number of applicable individuals | 5 | 5 | 5 |
| Group from which individuals were derived | All A | All B | All C |

Fig. 8

| Type of fertilization | | A | B | C |
|---|---|---|---|---|
| Diagnosis (on 2nd week) | Hydroponic solution I | 5 | 5 | 0 |
| | Hydroponic solution III | 0 | 0 | 5 |

Fig. 9

| Type of fertilization | | A | B | C |
|---|---|---|---|---|
| Diagnosis (on 2nd week) | Hydroponic solution I | 4 | 4 | 0 |
| | Hydroponic solution III | 1 | 1 | 5 |

Fig. 10

| Type of fertilization | | A | B | C |
|---|---|---|---|---|
| Diagnosis (on 2nd week) | Hydroponic solution I | 4 | 5 | 0 |
| | Hydroponic solution III | 1 | 0 | 5 |

Fig. 11

| Type of fertilization | | A | B | C |
|---|---|---|---|---|
| Diagnosis (on 2nd week) | Hydroponic solution I | 5 | 5 | 4 |
| | Hydroponic solution III | 0 | 0 | 1 |
| Diagnosis (on 4th week) | Hydroponic solution I | 5 | 5 | 1 |
| | Hydroponic solution III | 0 | 0 | 4 |

METHOD FOR SELECTING MARKER FOR DIAGNOSIS OF NUTRITIONAL STATUS OF PLANT, METHOD FOR DIAGNOSING NUTRITIONAL STATUS OF PLANT, AND METHOD FOR DETERMINING GROWTH STATUS

CROSS-REFERENCE TO RELATED APPLICATIONS

This application is a 371 of PCT/JP2010/058868, filed May 26, 2010, which claims the benefit of Japanese Patent Application No. 2009-200839, filed August 31, 2009, the contents of each of which are incorporated herein by reference.

TECHNICAL FIELD

The present invention relates to a method for selecting a marker for diagnosis of the nutritional status of a plant, a method for diagnosing the nutritional status of a plant, a method for determining the growth status, and a marker for diagnosis of the nitrogen status.

BACKGROUND ART

In agriculture and forestry, it is important for efficient growth of plants of interest in a short period to give necessary nutrients in proper amounts when necessary. It is therefore necessary to accurately judge the nutritional statuses of plants and appropriately fertilize them according to the results.

Subjective methods have heretofore been adopted, in which growers judge the nutritional statuses of plants on the basis of their experience and guess and also practice fertilization itself on the basis of the judgment. However, several years are required for cultivating skilled growers capable of such judgment. Also, the judgment disadvantageously differs among growers, in some cases. The further problem of the subjective methods is that whether or not plants are actually provided with their necessary nutrition in necessary amounts when necessary or how much contribution the applied nutrition makes to plant growth cannot be judged objectively.

In recent years, a method has been developed, which comprises analyzing element contents such as nitrogen, phosphorus, and potassium contents in leaves by a Kjeldahl method or an inductively coupled plasma (ICP) analysis method and estimating the nutritional status of the plant from the numeric values to determine the type and amount of a fertilizer (Non Patent Literature 1). This method is based on an objective judgment approach and is theoretically excellent. However, generally, plants largely differ in element contents therein depending on, for example, a difference in growing environments or places, i.e., a difference in stresses of environmental factors under which the plants are placed, even when they are provided with the same fertilizer in the same amount. This method is therefore applicable to only plants cultured in the same environment, i.e., under the same stress. Thus, the method is disadvantageously of limited application and is less practical.

There is also a method for estimating the health of plants using the spectral reflection characteristics of their leaves (Patent Literature 1). This method comprises preparing a database on the reflection spectra of various plants, and comparing the database with sampled data on the spectral reflectances of plants obtained by a high-resolution remote sensing satellite technique to thereby determine the vitality of the plants. However, this method also results in spectra differing depending on different leaves in one individual or a difference in date and time and is therefore applicable to only plants cultured under the same conditions. Thus, the method has disadvantages such as little practicality.

Thus, none of the previously known methods permit accurate and objective judgment of the nutritional status of a plant without being influenced by various stresses.

CITATION LIST

Patent Literature
Patent Literature 1: JP Patent Publication (Kokai) No. 2007-166967 A (2007)
Non Patent Literature
Non Patent Literature 1: Soil, Water Quality, and Plant Analysis Methods for Monitoring Functions of Soil, Japan Soil Association.

SUMMARY OF INVENTION

Technical Problem

An object of the present invention is to develop and provide a method for selecting a marker for diagnosis of the nutritional status capable of reflecting the status of a particular nutrient in a plant without being influenced by various stresses in environmental factors, etc.

Another object of the present invention is to provide a method for accurately diagnosing the status of a particular nutrient in a plant without being influenced by various stresses, by using a marker for diagnosis of the nutritional status selected by the method.

A further object of the present invention is to provide a method for determining the growth status of a test plant and predicting its future growth by using a marker for diagnosis of the nutritional status selected by the method.

Solution to Problem

To attain the objects, the present inventors have conducted diligent studies by focusing on metabolites whose relationship with the nutritional status of a plant has been unknown so far. As a result, the present inventors have found that a metabolite quantitatively changed depending on only the status of a particular nutrient in a plant can serve as a marker for diagnosis of the nutritional status reflecting the status of the particular nutrient in the plant without being influenced by various stresses in the environment. It has also been revealed that use of this marker for diagnosis of the nutritional status allows accurate diagnosis of the status of a particular nutrient in a test plant and determination of its growth status. The present invention is based on these findings and specifically provides the followings:

(1) A method for selecting a marker for diagnosis of the nutritional status of a plant comprising: an extraction step of extracting a metabolite-containing extract from the whole or a portion of each of a plant deficient in a particular nutrient and the plant provided with the nutrient; and a selection step of comparing between the plants the accumulation of each metabolite obtained in the extraction step to select a metabolite confirmed to have a statistically significant quantitative difference therebetween as the marker for diagnosis of the nutritional status with which the status of the particular nutrient is diagnosed.

(2) The selection method according to (1), wherein the deficiency in a particular nutrient is a status in which the particular nutrient has been depleted.

(3) A method for selecting a marker for diagnosis of the nutritional status of a plant, comprising: a first extraction step of extracting a metabolite-containing extract from the whole or a portion of each of a plant deficient in a particular nutrient and the plant provided with the nutrient; a first selection step of comparing between the plants the accumulation of each metabolite obtained in the first extraction step to select metabolites confirmed to have a statistically significant quantitative difference therebetween as first marker candidates; a second extraction step of extracting a metabolite-containing extract from the whole or a portion of the plant provided with the particular nutrient in an amount different from an amount that makes the plant deficient therein in the first extraction step; a second selection step of comparing the accumulation of each metabolite between at least one of the plants of the first extraction step and the plant of the second extraction step to select metabolites confirmed to have a statistically significant quantitative difference therebetween as second marker candidates; and a third selection step of selecting a metabolite present in common in both of a candidate group consisting of the first marker candidates and a candidate group consisting of the second marker candidates as the marker for diagnosis of the nutritional status with which the status of the particular nutrient is diagnosed.

(4) The selection method according to (3), wherein the deficiency in a particular nutrient in one of the two plants in the first extraction step is a status in which the particular nutrient has been depleted.

(5) The selection method according to any of (1) to (4), wherein the statistically significant quantitative difference is 1.3 times or more.

(6) The selection method according to any of (1) to (5), wherein the comparison of the accumulation of each metabolite is performed using mass spectrometry.

(7) The selection method according to any of (1) to (6), wherein statistical processing is performed using multiple comparison test.

(8) The selection method according to any of (1) to (7), wherein the particular nutrient is nitrogen (N), phosphorus (P), potassium (K), boron (B), or a combination thereof.

(9) The selection method according to any of (1) to (8), wherein the metabolite is a protein and/or a low-molecular-weight compound.

(10) A marker for diagnosis of the nitrogen status of a plant, the marker being any one shown in Table 2.

(11) The marker for diagnosis of the nitrogen status according to (10), wherein the plant is *Eucalyptus globulus*, and the marker is represented by any of Mass Nos. 1 to 270 in Table 2.

(12) The marker for diagnosis of the nitrogen status according to (10), wherein the plant is *Eucalyptus deglupta×camaldulensis*, and the marker is represented by any of Mass Nos. 15, 31, 42, 43, 51, 57, 59, 68, 84, 91, 104, 110, 111, 148, 149, 156, 241, 263, 264, and 269 in Table 2.

(13) The marker for diagnosis of the nitrogen status according to (10), wherein the plant is *Oryza sativa*, and the marker is represented by any of Mass Nos. 5, 170, and 173 in Table 2.

(14) The marker for diagnosis of the nitrogen status according to (10), wherein the plant is *Zea mays*, and the marker is represented by any of Mass Nos. 7, 17, 22, 29, 30, 35, 37, 48, 60, 65, 72, 76, 77, 88, 89, 92, 106, 140, 142, 148, 153, 154, 242, and 257 in Table 2.

(15) The marker for diagnosis of the nitrogen status according to (10), wherein the plant is *Solanum lycopersicum*, and the marker is represented by any of Mass Nos. 43, 246, and 265 in Table 2.

(16) The marker for diagnosis of the nitrogen status according to (10), wherein the plant is *Solanum melongena*, and the marker is represented by any of Mass Nos. 104, 144, 242, 257, and 265 in Table 2.

(17) A method for diagnosing the status of a particular nutrient in a plant, comprising: a metabolite extraction step of extracting a metabolite-containing extract from the whole or a portion of a test plant; and a determination step of comparing the accumulation of a marker for diagnosis of the nutritional status contained in the extract obtained in the metabolite extraction step with that in the plant provided with the nutrient as a control to determine the insufficiency or sufficiency of the nutrient in the test plant on the basis of the state and degree of a difference therebetween, the marker for diagnosis of the nutritional status being selected by a method according to any of (1) to (9).

(18) The method according to (17), wherein the marker for diagnosis of the nutritional status has a property by which its accumulation increases with increase in the amount of the particular nutrient, and the nutrient in the test plant is determined to tend to be insufficient when the accumulation of the marker for diagnosis of the nutritional status in the test plant is smaller than that in the control.

(19) The method according to (17), wherein the marker for diagnosis of the nutritional status has a property by which its accumulation decreases with increase in the amount of the particular nutrient, and the nutrient in the test plant is determined to tend to be insufficient when the accumulation of the marker for diagnosis of the nutritional status in the test plant is larger than that in the control.

(20) The diagnosis method according to any of (17) to (19), wherein the metabolite is a protein and/or a low-molecular-weight compound.

(21) The diagnosis method according to any of (17) to (20), wherein the particular nutrient is nitrogen (N), phosphorus (P), potassium (K), boron (13), or a combination thereof.

(22) The diagnosis method according to (21), wherein the particular nutrient is nitrogen, and the marker for diagnosis of the nutritional status of a plant is shown in Table 2.

(23) The diagnosis method according to (22), wherein the plant is *Eucalyptus globulus*, and the marker for diagnosis of the nutritional status is represented by any of Nos. 1 to 270 in Table 2.

(24) The diagnosis method according to (22), wherein the plant is *Eucalyptus deglupta×camaldulensis*, and the marker for diagnosis of the nutritional status is represented by any of Mass Nos. 15, 31, 42, 43, 51, 57, 59, 68, 84, 91, 104, 110, 111, 148, 149, 156, 241, 263, 264, and 269 in Table 2.

(25) The diagnosis method according to (22), wherein the plant is *Oryza sativa*, and the marker for diagnosis of the nutritional status is represented by any of Mass Nos. 5, 170, and 173 in Table 2.

(26) The diagnosis method according to (22), wherein the plant is *Zea mays*, and the marker for diagnosis of the nutritional status is represented by any of Mass Nos. 7, 17, 22, 29, 30, 35, 37, 48, 60, 65, 72, 76, 77, 88, 89, 92, 106, 140, 148, 142, 153, 154, 242, and 257 in Table 2.

(27) The diagnosis method according to (22), wherein the plant is *Solanum lycopersicum*, and the marker for diagnosis of the nutritional status is represented by any of Mass Nos. 43, 246, and 265 in Table 2.

(28) The diagnosis method according to (22), wherein the plant is *Solanum melongena*, and the marker for diagnosis of the nutritional status is represented by any of Mass Nos. 104, 144, 242, 257, and 265 in Table 2.

(29) A method for determining the amount of a particular nutrient applied, comprising determining the amount of the particular nutrient applied to a plant on the basis of a diagnosis result obtained by a method for diagnosing the status of a particular nutrient in a plant according to any of (17) to (28).

(30) The method according to (29), wherein the amount of the particular nutrient applied to a plant is increased to more than the amount of the particular nutrient applied immediately before the diagnosis when the diagnosis result obtained shows that the particular nutrient tends to be insufficient, or kept at the amount of the particular nutrient applied immediately before the diagnosis when the diagnosis result obtained shows that the particular nutrient is sufficient.

(31) A method for determining the growth status of a plant, comprising determining the growth status of the plant on the basis of two or more time-dependent diagnosis results obtained about the status of a particular nutrient in one plant by a diagnosis method according to any of (17) to (20).

(32) The determination method according to (31), wherein the growth status is determined to be favorable when the two or more time-dependent diagnosis results about the particular nutrient show that the particular nutrient is sufficient at all the points in time, determined to tend to improve when the two or more time-dependent diagnosis results about the particular nutrient show that the status of the particular nutrient has been shifted from insufficiency to sufficiency, determined to tend to deteriorate when the two or more time-dependent diagnosis results about the particular nutrient show that the status of the particular nutrient has been shifted from sufficiency to insufficiency, or determined to be poor when the two or more time-dependent diagnosis results about the particular nutrient show that the particular nutrient is insufficient at all the points in time.

(33) A method for determining the amount of a particular nutrient applied, comprising determining the amount of the particular nutrient applied to a plant on the basis of a determination result obtained by a method for determining the growth status of a plant according to (31) or (32).

(34) The method according to (33), wherein the amount of the particular nutrient applied to a plant is kept at the amount of the particular nutrient applied immediately before any diagnosis performed for the growth status determination when a determination result showing that the growth status of the plant is favorable is obtained from the two or more time-dependent diagnosis results about the particular nutrient, kept at the amount of the particular nutrient applied immediately before the final diagnosis performed for the growth status determination when a determination result showing that the growth status of the plant tends to improve is obtained therefrom, returned or increased to the amount of the particular nutrient applied immediately before the first diagnosis performed for the growth status determination when a determination result showing that the growth status of the plant tends to deteriorate is obtained therefrom, or increased to more than the amount of the particular nutrient applied during the diagnosis performed for the growth status determination when a determination result showing that the growth status of the plant is poor is obtained therefrom.

The present specification encompasses the contents described in the specification and/or drawings of Japanese Patent Application No. 2009-200839, which serves as a basis for the priority of the present application.

Advantageous Effects of Invention

According to a method of the present invention for selecting a marker for diagnosis of the nutritional status, a marker for diagnosis of the nutritional status capable of reflecting the status of a particular nutrient in a plant without being influenced by various stresses in environmental factors, etc., can be selected.

Moreover, according to a method of the present invention for diagnosing the nutritional status of a plant, the status of a particular nutrient in a test plant can be diagnosed accurately without being influenced by various stresses.

Furthermore, according to a method of the present invention for determining the growth status of a plant, the growth status of a test plant can be determined, and its future growth can be predicted.

Furthermore, according to a method of the present invention for determining the amount of a particular nutrient applied, the particular nutrient can be applied in an appropriate amount to a test plant on the basis of a result obtained by the method of the present invention for diagnosing the nutritional status or for determining the growth status.

BRIEF DESCRIPTION OF DRAWINGS

FIG. 1 is a diagram showing results of diagnosing the nitrogen status of test *Eucalyptus* using markers for diagnosis of the nitrogen status of *Eucalyptus globulus*.

FIG. 4 is a diagram showing results of diagnosing the nitrogen status of field-cultured *Eucalyptus globulus* using markers for diagnosis of the nitrogen status of *Eucalyptus globulus*.

FIG. 6 is a diagram showing results of diagnosing the nitrogen status of field-cultured *Eucalyptus deglupta×camaldulensis* using markers for diagnosis of the nitrogen status of *Eucalyptus deglupta×camaldulensis*.

FIG. 8 is a diagram showing results of diagnosing the nitrogen status of field-cultured *Solanum melongena* using markers for diagnosis of the nitrogen status of *Solanum melongena*.

FIG. 9 is a diagram showing results of diagnosing the nitrogen status of field-cultured *Solanum lycopersicum* using markers for diagnosis of the nitrogen status of *Solanum lycopersicum*.

FIG. 10 is a diagram showing results of diagnosing the nitrogen status of field-cultured *Zea mays* using markers for diagnosis of the nitrogen status of *Zea mays*.

FIG. 11 is a diagram showing results of diagnosing the nitrogen status of field-cultured *Oryza sativa* using markers for diagnosis of the nitrogen status of *Oryza sativa*.

*gena* on the first month of planting. In the diagram, * represents that the amount of growth was significantly different with 1% or less level between both hydroponic solutions.

Figure 13:
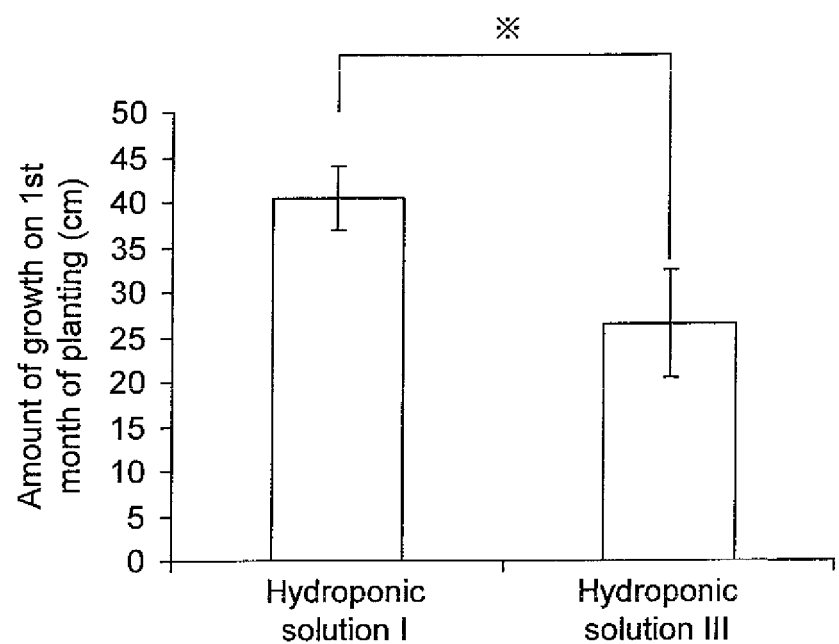

FIG. 13 is a diagram showing the amount of growth of each diagnostic pattern group of field-cultured *Solanum lycopersicum* on the first month of planting. In the diagram, * represents that the amount of growth was significantly different with 1% or less level between both hydroponic solutions.

Figure 14:
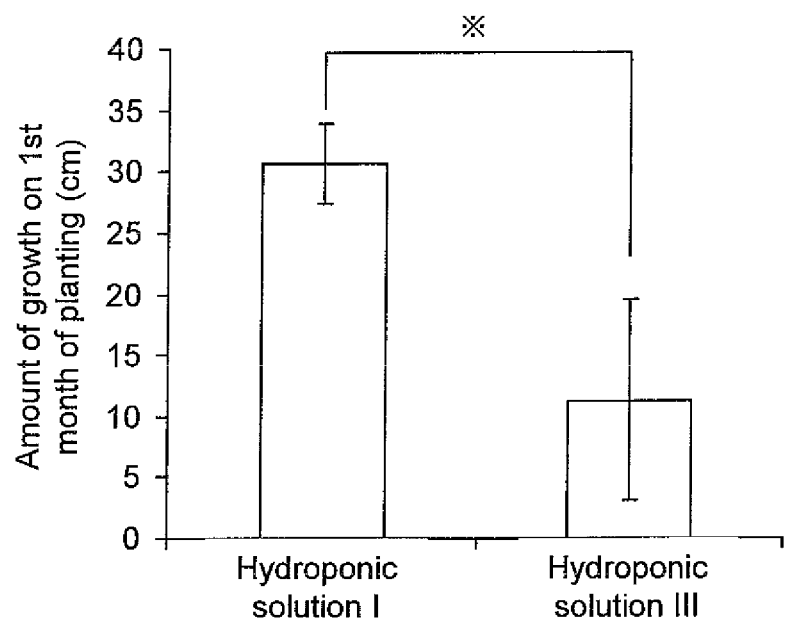

FIG. 14 is a diagram showing the amount of growth of each diagnostic pattern group of field-cultured *Zea mays* on the first month of planting. In the diagram, * represents that the amount of growth was significantly different with 1% or less level between both hydroponic solutions.

Figure 15:
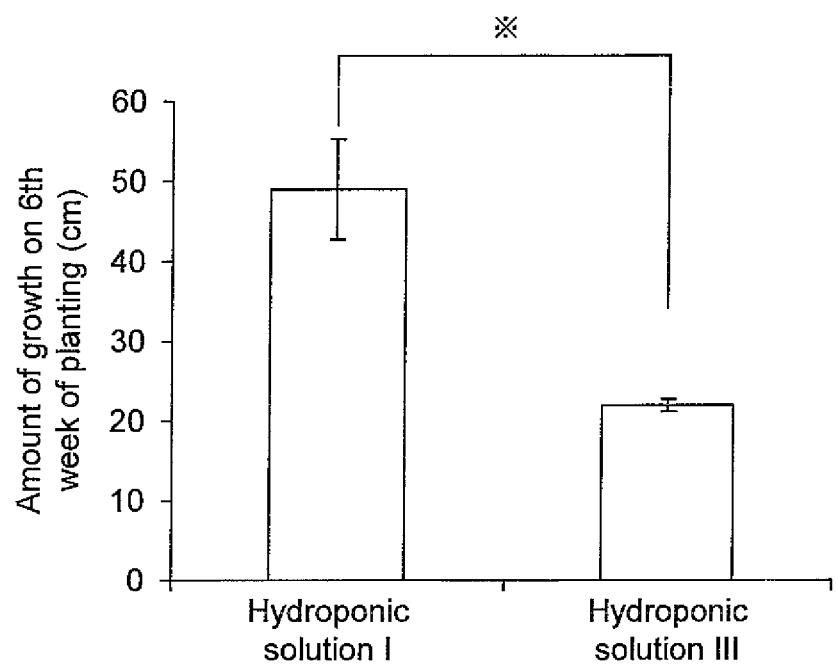

FIG. 15 is a diagram showing the amount of growth of each diagnostic pattern group of field-cultured *Oryza sativa* on the sixth week of planting. In the diagram, * represents that the amount of growth was significantly different with 1% or less level between both hydroponic solutions.

DESCRIPTION OF EMBODIMENTS

1. Method (1) for Selecting Marker for Diagnosis of Nutritional Status

One aspect of the present invention is a method for selecting a marker for diagnosis of the nutritional status, in which, of metabolites obtained from each of two plants, one of which is deficient in a particular nutrient and the other of which is sufficiently provided with the particular nutrient, a metabolite confirmed to have a statistically significant quantitative difference between the plants is selected as the marker for diagnosis of the nutritional status in relation to the particular nutrient in the plant. The method of the present invention for selecting a marker for diagnosis of the nutritional status comprises an extraction step and a selection step. Hereinafter, each step will be described specifically.

1.1. Extraction Step

The "extraction step" is the step of extracting a metabolite-containing extract from the whole or a portion of each of a plant deficient in a particular nutrient and the plant provided with the nutrient.

In the present specification, the term "plant" refers to a bryophyte, a pteridophyte, and a spermatophyte. The plant is preferably a spermatophyte. Any gymnosperm or angiosperm or any herbaceous or woody plant can be used as the spermatophyte.

In the present specification, the term "nutrient" refers to an element whose deficiency causes some abnormality in the growth or reproduction of a plant, which cannot recover the symptoms by the supply of other elements. The nutrient means an essential element in plants as a rule. General essential elements in plants include 16 elements, i.e., hydrogen (H), oxygen (O), carbon (C), nitrogen (N), phosphorus (P), potassium (K), magnesium (Mg), calcium (Ca), sulfur (S), iron (Fe), manganese (Mg), zinc (Zn), boron (B), molybdenum (Mo), copper (Cu), and chlorine (Cl). In the present specification, the nutrient also refers to these elements as a rule. Among the essential elements, nitrogen, phosphorus, potassium, boron, magnesium, calcium, and sulfur are preferable as the particular nutrient of the present invention, and nitrogen, phosphorus, potassium, and boron are particularly preferable. Alternatively, the nutrient of the present invention can also include elements that are not essential elements, but are necessary for the growth and reproduction of a particular plant. Examples thereof include silicon (Si) which is useful for the growth of *Oryza sativa*. In the present specification, the term "particular nutrient" refers to one or more nutrient(s) selected from the nutrient group described above.

In the present specification, the "whole" of the plant refers to the whole part constituting the intended plant. Moreover, a "portion" of the plant refers to an organ (e.g., a root, a stem, a leaf, a flower, or a spore or seed) constituting the intended plant, a tissue which is a population of morphologically and functionally differentiated cells constituting the organ, or a cell constituting the tissue.

In the present specification, the term "metabolism" encompasses any of catabolism typified by respiration and assimilatory metabolism typified by photosynthesis. Thus, in the present specification, the term "metabolite" refers to every substance that has been or will be formed by the metabolism of a plant. For example, a substance that quantitatively differs between two plant individuals (groups) of the same species placed under different nutrient conditions can be regarded as the metabolite as a rule.

In the present invention, the metabolite can be identified using a chemical analysis approach (e.g., mass spectrometry) and/or a biological analysis approach (e.g., antigen-antibody reaction), and it is not necessarily required to determine the chemical structure of the metabolite. For example, for analyzing the metabolite by mass spectrometry, it is only required to identify a retention time and a mass-to-charge ratio. Moreover, for using an antibody specific for a single molecule having an unknown chemical structure or the like, it is only required to determine the presence or absence of antigen-antibody reaction. Examples of the metabolite include proteins (including enzymes) and low-molecular-weight compounds (including plant hormones, polyphenols, sugars, amino acids, and nucleotides). Furthermore, the metabolite may be water-soluble or lipid-soluble.

The "extract" refers to a plant extract, usually, a plant extraction solution, containing a plurality of metabolites. The extract may contain substances other than metabolites, for example, substances such as fertilizers, which have been incorporated directly by plants from the outside world. This is because such substances can be differentiated from the metabolites as long as the applied or added substances are evident. Since the metabolite may be water-soluble or lipid-soluble, a solvent used in the extraction of the extract can be any of aqueous solutions or organic solvents.

The "plant deficient in a particular nutrient" refers to an intended plant that is artificially deficient in only the particular nutrient. In this context, the term "deficient" refers to falling short of an amount necessary for the normal growth or reproduction of the intended plant (this amount is referred to as a necessary reference amount) and encompasses reduction, removal, or substantial removal. The "substantial removal" refers to a status equal to removal because the particular nutrient is very slightly contained, but immediately exhausted by absorption in the plant. For example, nitrogen supplied in an amount of 40 µM is immediately absorbed and exhausted in *Eucalyptus globulus*, which is a *Eucalyptus* species, during the process of its growth. This amount of nitrogen supplied corresponds to substantial removal.

The deficiency in a particular nutrient is preferably a status in which the particular nutrient has been depleted or substantially depleted. This is because in the subsequent "selection step", a clear quantitative difference in the accumulation of each metabolite is obtained in the comparison thereof with the individual (group) provided with the particular nutrient.

"The plant provided with the nutrient" refers to a plant that is of the same species as the plant deficient in a particular nutrient and is sufficiently provided with the same particular nutrient thereas. The term "sufficiently provided" means that the intended plant is provided with the particular nutrient in an amount equal to or larger than its necessary reference amount. The necessary reference amount of the particular nutrient differs depending on plant species and can thus be determined appropriately within the technical scope of the art in consideration of a necessary reference amount known in the art according to intended plant species. For example, for the *Eucalyptus globulus*, approximately 1000 μM usually suffices as the necessary reference amount of nitrogen.

A quantitative difference in the amount of the particular nutrient supplied between the plant deficient in a particular nutrient and the plant provided with the nutrient is not particularly limited. However, if the quantitative difference is small, a metabolite confirmed to have a statistically significant quantitative difference therebetween might not be selected in the subsequent "extraction step" as a result of the growth of both the plants under close conditions. Thus, preferably, the quantitative difference is large. Most preferably, the amount of the particular nutrient supplied to the plant deficient in a particular nutrient corresponds to a status in which the particular nutrient has been depleted (the amount of the particular nutrient supplied: 0) or substantially depleted, as described above.

Conditions other than the amount of the particular nutrient supplied, for example, the types (including varieties and strains) of the plants, other nutrients, weather conditions (e.g., air temperature, hours of sunlight, and humidity), soil conditions, time conditions (e.g., growing period and growing season), and the health of the plants are set to the same, as a rule, between the two plant individuals (groups) used in this step. For thus adjusting the amount of the particular nutrient of interest supplied such that only this amount specifically differs between the two plants, it is preferred that the plants should be raised by, preferably, hydroponic culture, in synthetic media, for example, in artificial environments such as artificial climate chambers. This is because two plants differing in the amount of the particular nutrient of interest supplied can be prepared easily, for example, by selectively adjusting the amount of the particular nutrient of interest supplied in complete synthetic media and making the other conditions same. For example, when nitrogen is used as the particular nutrient as described above, plants can be raised in synthetic media each containing 40 μM nitrogen (amount that makes the plant substantially deficient therein) or 4000 μM nitrogen (equal to or larger than the necessary reference amount) to thereby easily obtain the plants of interest differing in the amount of nitrogen supplied, one of which is deficient in nitrogen and the other of which is sufficiently provided therewith.

Such plants differing in the amount of the particular nutrient supplied include not only seedling individuals (groups) raised from seeds or the like under conditions involving the adjusted amount of the particular nutrient supplied, but also individuals (groups) having the same degree of growth thereas after being raised under usual nutritional conditions for a given period and then transferred to the conditions described above.

Complete synthetic media known in the art can be used. For example, complete synthetic media described in the document (title: New Manual for Nutrient Culture, ed. by Japan Greenhouse Horticulture Association) can usually be used. Alternatively, specific synthetic media optimized for the intended plants may be used when known in the art.

In the extraction step, an extract is extracted from the whole or a portion of each of two plant individuals (groups). For the extraction from a portion of each of individuals (groups), the same part between both the individuals (groups) is used as the portion. For example, an extract is extracted from the leaf of one individual (group), while an extract is extracted from the leaf of the other individual (group). A method for extracting the extract is not particularly limited as long as it is a method capable of extracting metabolites from plants. For example, to obtain water-soluble metabolites, each plant is pulverized, as needed, and then supplemented with water, and the solution can be compressed and then filtered. Alternatively, to obtain lipid-soluble metabolites, each plant can be pulverized, as needed, then dipped in an organic solvent such as methanol for a predetermined period, and then filtered. Techniques known in the art can be used as these extraction methods, and for the details thereof, see, for example, methods described in the documents: Yoko Iijima et al., The Plant Journal (2008) 54, 949-962; and Hideyuki Suzuki et al., Phytochemistry (2008) 69, 99-111.

1.2. Selection Step

The "selection step" is the step of comparing between the plants the accumulation of each metabolite obtained in the extraction step to select a metabolite confirmed to have a statistically significant quantitative difference therebetween as the marker for diagnosis of the nutritional status with which the status of the particular nutrient is diagnosed.

The "accumulation" refers to the amount of a particular metabolite in the extract obtained in the extraction step. The accumulation may be a relative amount such as concentration or may be the absolute amount of the metabolite when the volume of the extract is equal between the plants to be compared.

In this step, the accumulations of the same metabolites contained in the respective extracts are first compared between both the plants. A method for detecting and quantifying a particular metabolite in the extract is not particularly limited as long as it is a method capable of detecting and quantifying the particular metabolite. The metabolite can be detected and quantified using, for example, mass spectrometry, a method using antigen-antibody reaction, and electrophoresis. The mass spectrometry includes high-performance liquid chromatography-mass spectrometry (LC-MS), high-performance liquid chromatography-tandem mass spectrometry (LC-MS/MS), gas chromatography-mass spectrometry (GC-MS), gas chromatography-tandem mass spectrometry (GC-MS/MS), capillary electrophoresis-mass spectrometry (CE-MS), and ICP-mass spectrometry (ICP-MS). Enzyme-linked immunosorbent assay (ELISA), a surface plasmon resonance (SPR) method, or a quarts crystal microbalance (QCM) method can be used as the method using antigen-antibody reaction. Moreover, when the metabolite to be analyzed is a protein, for example, two-dimensional electrophoresis can be used as the electrophoresis. All of these analysis methods are techniques known in the art and can be performed according to the methods. See, for example, the documents: Yoko Tijima et al., The Plant Journal (2008) 54, 949-962; Masami Hirai et al., Proc Natl Acad Sci USA (2004) 101 (27) 10205-10210; Shigeru Sato et al., The Plant Journal (2004) 40 (1) 151-163; and Motoyuki Shimizu et al., Proteomics (2005) 5, 3919-3931.

Next, a metabolite confirmed to have a statistically significant quantitative difference therebetween as a result of the comparison is selected as the marker for diagnosis of the nutritional status with which the status of the particular nutrient is diagnosed. The statistically significant quantitative difference is 1.3 times or more, preferably 1.5 times or more, more preferably 1.7 times or more, further preferably 2 times or more. The statistically significant quantitative difference may be larger or smaller in the metabolite derived from the plant deficient in a particular nutrient than the metabolite derived from the plant provided with the nutrient as a control. This means that, for example, when the quantitative difference is 2 times or more with statistical significance, the metabolite derived from one plant may have 2 times or more the accumulation of the metabolite derived from the other plant or may have ½ or less the accumulation thereof. This is because any metabolite that specifically increases or decreases in comparison between plant individuals (groups), one of which is deficient in a particular nutrient and the other of which is sufficiently provided with the particular nutrient can be a candidate of the marker for diagnosis of the nutritional status of the present invention. Thus, a metabolite that is present in one plant and absent in the other plant may also serve as the marker for diagnosis of the nutritional status with which the status of the particular nutrient is diagnosed, as long as a statistically significant quantitative difference is confirmed.

The term "statistically significant" means that a significant difference is obtained between the metabolites derived from two plants in the statistical processing of the quantitative difference therebetween. Specific examples thereof include a significance level smaller than 5%, 1%, or 0.1%. A test method known in the art capable of determining the presence or absence of significance may be used appropriately without particular limitations as a test method in the statistical processing. For example, Student's t test or multiple comparison test can be used (see the document: Kanji Suzuki, Basic Statistics; and Yasushi Nagata, et al., Basic Statistical Multiple Comparison Method).

A database may be prepared on the accumulations of various metabolites obtained from plants of each species sufficiently provided with a particular nutrient. Such a database is convenient because it is applicable to a "method for diagnosing the status of a particular nutrient in a plant" and a "method for determining the growth status of a plant" (which will be described later) without newly obtaining control values from control plants for carrying out the method.

In the aspect of the present invention, the two plant individuals (groups) of the same species between which the accumulation of each metabolite is compared are raised under the same conditions except for the amount of the particular nutrient supplied, as a rule. In this case, only a stress related to the particular nutrient is imparted to the intended plants thus differing in only the amount of the particular nutrient supplied. It is thus presumed that the metabolite obtained as a marker for diagnosis of the nutritional status by the selection method of the present invention directly or indirectly responds to only the stress of the particular nutrient and is not or hardly influenced by other stresses, for example, other nutrients, soil conditions, weather conditions, and growing period. In actuality, as shown in Example 4 described later, similar diagnosis results were successfully drawn from even plants cultured under temporally or environmentally different stresses by using markers for diagnosis of the nutritional status selected by the selection method of the present invention. Hence, the method of the present invention for selecting a marker for diagnosis of the nutritional status can provide a marker for diagnosis of the nutritional status with which the status of a particular nutrient in a plant can be judged accurately without being influenced by various stresses. As far as the present inventors know, such a marker for diagnosis of the nutritional status with which the nutritional status of a test plant can be diagnosed accurately without being influenced by various stresses has heretofore been unknown. In this regard, the present invention is superior to the conventional techniques.

2. Method (2) for Selecting Marker for Diagnosis of Nutritional Status

One aspect of the present invention is a selection method in which: of metabolites extracted from each of two plants, one of which is deficient in a particular nutrient and the other of which is sufficiently provided with the particular nutrient, metabolites confirmed to have a statistically significant quantitative difference between the plants are selected as first marker candidates; in addition, metabolites confirmed to have a statistically significant quantitative difference between the metabolites extracted from at least one of the two plants and metabolites extracted from the plant provided with the particular nutrient in an amount different from an amount that makes the plant deficient therein in the first extraction step, are selected as second marker candidates; and a common metabolite in both of the marker candidate groups is selected as the marker for diagnosis of the nutritional status with which the status of the particular nutrient is diagnosed. Specifically, the selection method according to the preceding aspect is performed using 2 different amounts of the particular nutrient supplied, whereas the feature of this aspect is that at least 3 different amounts thereof are used. The marker for diagnosis of the nutritional status can be selected more accurately by selecting a metabolite having a statistically significant quantitative difference among 3 or more different amounts of the particular nutrient supplied than by selecting that between 2 or more different amounts thereof.

The method of the present invention for selecting a marker for diagnosis of the nutritional status comprises a first extraction step, a first selection step, a second extraction step, a second selection step, and a third selection step. Hereinafter, each step will be described specifically.

2.1. First Extraction Step

The "first extraction step" is the step of extracting a metabolite-containing extract from the whole or a portion of each of a plant deficient in a particular nutrient and the plant provided with the nutrient. This step is the same as the "extraction step" in the paragraph "Method (1) for selecting marker for diagnosis of nutritional status" in terms of requirements and procedures and can be performed according to the "extraction step". Thus, the detailed description thereof is omitted.

2.2. First Selection Step

The "first selection step" is the step of comparing between the plants the accumulation of each metabolite obtained in the first extraction step to select metabolites confirmed to have a statistically significant quantitative difference therebetween as first marker candidates. Basically, this step is also the same as the "selection step" in the paragraph "Method (1) for selecting marker for diagnosis of nutritional status" in terms of requirements and procedures and can be performed according to the "selection step". However, unlike the preceding "selection step", the metabolites selected in this step serve as first marker candidates of the marker for diagnosis of the nutritional status. According to one embodiment, in this step, one of the two plants in the first extraction step can be used as the plant deficient in a particular nutrient.

23. Second Extraction Step

The "second extraction step" is the step of extracting a metabolite-containing extract from the whole or a portion of the plant provided with the particular nutrient in an amount different from an amount that makes the plant deficient therein in the first extraction step. For example, the first extraction step may comprise extracting an extract from each of two *Eucalyptus globulus* individuals (groups) having nitrogen supplied thereto in an amount of 0 μM (nitrogen-deficient status) or 4000 μM (status that satisfies the necessary reference amount), and the second extraction step may comprise extracting an extract from an *Eucalyptus globulus* individual (group) having nitrogen supplied thereto in an amount of 40 μM (nitrogen-deficient status).

The "amount that makes the plant deficient therein" refers to the amount of the particular nutrient supplied in which the intended plant is deficient in the particular nutrient. For example, the particular nutrient provided to the plant is absent, i.e., the amount of the particular nutrient supplied corresponds to a status in which the particular nutrient has been depleted (i.e., the amount of the particular nutrient supplied: 0), substantially depleted, or has been reduced to less than the necessary reference amount.

A quantitative difference between the amount that makes the plant deficient in the particular nutrient in the first extraction step and the amount that makes the plant deficient in the particular nutrient in the second extraction step is not particularly limited. However, if the quantitative difference is small, metabolites confirmed to have a statistically significant quantitative difference therebetween might not be selected in the subsequent "second selection step" as a result of the growth of both the plants under close conditions. Thus, preferably, the quantitative difference is large.

In the second extraction step, two or more plants may be provided with the particular nutrient in "an amount different from an amount that makes the plant deficient therein". In this case, the marker for diagnosis of the nutritional status can be selected on the basis of a total of 4 or more different amounts of the particular nutrient supplied. The resulting marker for diagnosis of the nutritional status in relation to the particular nutrient presumably has higher reliability. However, a total of 3 different amounts of the particular nutrient supplied usually suffice for the selection of the marker for diagnosis of the nutritional status on the basis thereof.

The second extraction step may be carried out concurrently with the first extraction step. This is because for these extraction steps, it is only required to extract an extract from each of 3 or more plants differing in the amount of the particular nutrient supplied, irrespective of the order of extraction. For example, an extract can be extracted from each of an intended plant from which the particular nutrient has been depleted, the intended plant provided with the nutrient in a reduced amount, and the intended plant sufficiently provided with the nutrient.

2.4. Second Selection Step

The "second selection step" is the step of comparing the accumulation of each metabolite between at least one of the plants of the first extraction step and the plant of the second extraction step to select metabolites confirmed to have a statistically significant quantitative difference therebetween as second marker candidates. As in the first selection step, this step can basically be performed according to the requirements and procedures of the "selection step" in the paragraph "Method (1) for selecting marker for diagnosis of nutritional status". This step differs from the "selection step" in that the "selection step" comprises comparing the accumulation of each metabolite between the plant deficient in a particular nutrient and the plant provided with the nutrient, whereas this step comprises comparing the accumulation of each metabolite derived from at least one of the two plants of the first extraction step with the accumulation of the same metabolite thereas obtained in the second extraction step. For example, an extract obtained from the plant deficient in a particular nutrient in the first extraction step is defined as A; an extract obtained from the plant provided with the nutrient is defined as B; and an extract obtained in the second extraction step is defined as C. In this step, the accumulation of each metabolite is compared between A and C and/or B and C. Preferably, the metabolite is compared between B and C or between A and C and B and C.

2.5. Third Selection Step

The "third selection step" is the step of selecting a metabolite present in common in both of a candidate group consisting of the first marker candidates and a candidate group consisting of the second marker candidates as the marker for diagnosis of the nutritional status in relation to the particular nutrient. When a large number of marker candidates constitute these candidate groups, each candidate group can be input into computer so that common marker candidates in both the candidate groups are selected by commands to thereby easily obtain the marker of interest for diagnosis of the nutritional status.

3. Marker for Diagnosis of Nitrogen Status

A further aspect of the present invention is a marker for diagnosis of the nitrogen status of a plant. The marker for diagnosis of the nitrogen status according to the aspect of the present invention is selected, as shown in Examples 1, 6, and 9 described later, using the method described above in the paragraph "Method (1) for selecting marker for diagnosis of nutritional status", wherein the particular nutrient is nitrogen and the plant is *Eucalyptus globulus*, *Eucalyptus deglupta*×*camaldulensis*, which is a hybrid of *Eucalyptus deglupta* and *Eucalyptus camaldulensis*, *Oryza sativa*, *Zea mays*, *Solanum lycopersicum*, or *Solanum melongena*.

The marker for diagnosis of the nitrogen status of the present invention is any of 312 markers shown in Table 2 (Tables 2-1 to 2-4). Each marker is specified by a retention time (min.) at mass and a mass-to-charge ratio (m/z).

Of the markers for diagnosis of the nitrogen status of the present invention shown in Table 2, markers of Mass Nos. 1 to 270 are selected, as shown in Example 1 described later, using the method described above in the paragraph "Method (2) for selecting marker for diagnosis of nitrogen status". Preferably, these markers are used as markers for diagnosis of the nitrogen status of *Eucalyptus globulus*. Markers for diagnosis of the nitrogen status represented by Mass Nos. 15, 31, 42, 43, 51, 57, 59, 68, 84, 91, 104, 110, 111, 148, 149, 156, 241, 263, 264, and 269 in Table 2 are particularly preferable as markers for diagnosis of the nitrogen status of *Eucalyptus deglupta*×*camaldulensis*. Moreover, markers for diagnosis of the nitrogen status represented by Mass Nos. 5, 170, and 173 in Table 2 are particularly preferable as markers for diagnosis of the nitrogen status of *Oryza sativa*. Furthermore, markers for diagnosis of the nitrogen status represented by Mass Nos. 7, 17, 22, 29, 30, 35, 37, 48, 60, 65, 72, 76, 77, 88, 89, 92, 106, 140, 148, 142, 153, 154, 242, and 257 in Table 2 are particularly preferable as markers for diagnosis of the nitrogen status of *Zea mays*. Furthermore, markers for diagnosis of the nitrogen status represented by Mass Nos. 43, 246, and 265 in Table 2 are particularly preferable as markers for diagnosis of the nitrogen status of *Solanum lycopersicum*. Furthermore, markers for diagnosis of the nitrogen status represented by Mass Nos. 104, 144, 242, 257, and 265 in Table 2 are particularly preferable as markers for diagnosis of the nitrogen status of *Solanum melongena*.

The markers for diagnosis of the nitrogen status of the present invention shown in Table 2 can also be used for other monocotyledonous or dicotyledonous plants or other gymnosperms or angiosperms. These markers can also be used preferably, particularly for species phylogenetically close to the species of the plants described above (e.g., *Eucalyptus* plants such as *Eucalyptus camaldulensis*, *Eucalyptus grandis*, *Eucalyptus urophylla*, *Eucalyptus pellita*, *Eucalyptus deglupta*, and *Eucalyptus tereticornis*).

The marker for diagnosis of the nitrogen status of the present invention serves as an effective biomarker for objectively estimating whether or not a test plant has a sufficient nitrogen content. In addition, this marker allows accurate determination of the nitrogen status of a test plant without being influenced even by stresses based on various environmental factors.

4. Method for Diagnosing Nutritional Status of Plant

One aspect of the present invention is a method for diagnosing the status of a particular nutrient in a plant. The diagnosis method of the present invention comprises a metabolite extraction step and a determination step. Hereinafter, each step will be described specifically.

4.1. Metabolite Extraction Step

The "metabolite extraction step" is the step of extracting a metabolite-containing extract from the whole or a portion of a test plant.

In the present specification, the term "test plant" refers to a plant subjected to the diagnosis method of the present invention for diagnosing its nutritional status. A plant raised in an arbitrary environment can be used.

In this step, an extract can be extracted from the whole or a portion of a test plant in the same way as the procedures of the "extraction step" in the paragraph "Method (1) for selecting marker for diagnosis of nutritional status". Thus, the description thereof is omitted here.

4.2. Determination Step

The "determination step" is the step of comparing the accumulation of one or more marker(s) for diagnosis of the nutritional status in the metabolite obtained in the metabolite extraction step with that in the plant sufficiently provided with the nutrient as a control to determine the insufficiency or sufficiency of the nutrient in the test plant on the basis of the state and degree of a difference therebetween, the one or more marker(s) for diagnosis of the nutritional status being selected in relation to the particular nutrient in the plant by any one of the methods for selecting a marker for diagnosis of the nutritional status.

In this step, a particular nutrient desired to be diagnosed is first determined. This nutrient means an essential element in plants as a rule, as described in the "extraction step" in the paragraph "Method (1) for selecting marker for diagnosis of nutritional status". Specifically, the nutrient includes hydrogen, oxygen, carbon, nitrogen, phosphorus, potassium, magnesium, calcium, sulfur, iron, manganese, zinc, boron, molybdenum, copper, and chlorine. Among these essential elements, nitrogen, phosphorus, potassium, boron, magnesium, calcium, and sulfur are preferable as the particular nutrient of the present invention, and nitrogen, phosphorus, potassium, and boron are particularly preferable. Alternatively, the nutrient of the present invention can also include elements that are not essential elements, but are necessary for the growth and reproduction of a particular plant. Examples thereof include silicon (Si) which is useful for the growth of *Oryza sativa*.

Next, one or more marker(s) for diagnosis of the nutritional status obtained by the method for selecting a marker for diagnosis of the nutritional status is selected on the basis of the same part (e.g. a leaf) as that of the test plant, as a rule, in relation to the same species as the test plant and the same nutrient as the determined particular nutrient. For example, when the nutritional status of nitrogen in a *Eucalyptus globulus* individual (group) as the test plant is diagnosed using a metabolite obtained from its leaf, the marker for diagnosis of the nutritional status used can be selected from markers for diagnosis of the nitrogen status based on metabolites obtained from the leaf of *Eucalyptus globulus*. When no marker for diagnosis of the nutritional status conforms to such conditions, a marker for diagnosis of the nutritional status obtained under conditions close thereto may be used.

Subsequently, the accumulation of a metabolite selected as the marker for diagnosis of the nutritional status in the test plant-derived extract obtained in the metabolite extraction step is compared with that in an extract from a control. In this context, the "control" refers to a control plant for the test plant. This control plant is provided with the determined particular nutrient in an amount sufficient for its growth and reproduction and has the same species as the test plant and the growth status equivalent thereto. The extract from the control and the accumulation of the marker for diagnosis of the nutritional status contained therein can be extracted or determined concurrently with the extraction of an extract from the test plant and the detection and quantification of the marker for diagnosis of the nutritional status. Alternatively, data on the previously obtained accumulations of markers for diagnosis of the nutritional status of the control may be accumulated in a database. In this case, an accumulation that conforms to conditions can be selected from the database and used in the present invention.

Specifically, for example, when the nitrogen status of a *Eucalyptus globulus* individual (group) as the test plant is diagnosed using a metabolite obtained from its leaf, the marker for diagnosis of the nutritional status used can be one or more marker(s) for diagnosis of the nitrogen status described in the paragraph "Marker for diagnosis of nitrogen status". Specifically, the accumulation of any one or more marker(s) for diagnosis of the nitrogen status described in the paragraph "Marker for diagnosis of nitrogen status" can be compared between the test plant and the control to determine the insufficiency or sufficiency of nitrogen in the test plant on the basis of the state and degree of a difference therebetween.

The comparison of the accumulation of the marker for diagnosis of the nutritional status between the test plant and the control is performed using the state and degree of a difference in accumulation between both the samples. The "state of a difference" means whether the accumulation of the marker for diagnosis of the nutritional status differing between the test plant and the control is larger in the test plant or the control. Also, the "degree of a difference" means how large the difference is in the accumulation of the marker for diagnosis of the nutritional status between the test plant and the control.

The insufficiency or sufficiency of the nutrient in the test plant is determined on the basis of the state and degree of the difference in the accumulation of the marker for diagnosis of the nutritional status between the test plant and the control.

Specific Examples of Methods for the Determination Include the Following Methods:

(1) The marker for diagnosis of the nutritional status in relation to the particular nutrient has a property by which its accumulation increases with increase in the amount of the nutrient, and the nutrient in the test plant can be determined to tend to be insufficient when the accumulation of the marker for diagnosis of the nutritional status in the test plant is smaller than that in the control, or determined to be sufficient when the accumulation thereof in the test plant is equal to or larger than that in the control. For example, the marker used is a marker for diagnosis of the nitrogen status having a property by which its accumulation increases with increase in the amount of nitrogen, and nitrogen in the test plant can be determined to tend to be insufficient when the accumulation of the marker for diagnosis of the nitrogen status in the test plant is smaller than that in the control, or determined to be sufficient when the accumulation thereof in the test plant is equal to or larger than that in the control.

(2) The marker for diagnosis of the nutritional status in relation to the particular nutrient has a property by which its accumulation decreases with increase in the amount of the nutrient, and the nutrient in the test plant can be determined to tend to be insufficient when the accumulation of the marker for diagnosis of the nutritional status in the test plant is larger than that in the control, or determined to be sufficient when the accumulation thereof in the test plant is equal to or smaller than that in the control. For example, the marker used is a marker for diagnosis of the nitrogen status having a property by which its accumulation decreases with increase in the amount of nitrogen, and nitrogen in the test plant can be determined to tend to be insufficient when the accumulation of the marker for diagnosis of the nitrogen status in the test plant is larger than that in the control, or determined to be sufficient when the accumulation thereof in the test plant is equal to or smaller than that in the control.

5. Method for Determining Growth Status of Plant

One aspect of the present invention is a method for determining the growth status of a plant. This method comprises determining the growth status of the plant on the basis of a result obtained by the method for diagnosing the nutritional status of a plant, and predicting the future growth of the plant from the determination result. Specifically, the growth status of the plant is determined on the basis of two or more time-dependent results obtained about the status of a particular nutrient in one plant by any one method described above in the paragraph "Method for diagnosing nutritional status of plant".

The "growth status of the plant" encompasses the growth rate of the plant, the favorable or poor growth of the plant within a predetermined period, or the course of growth.

The "two or more time-dependent results" mean nutritional status diagnosis results obtained about the particular nutrient under the same diagnosis conditions from samples collected at two or more different points in time from one plant. The interval between the samplings can be determined without particular limitations according to the type of the plant, a growing environment, etc. However, if the interval is too short, the growth status might not be determined accurately. Thus, the interval is an appropriate period, for example, 3 days or longer, preferably 1 week or longer, more preferably 1 month or longer or 3 months or longer.

Specific Examples of Determination Methods for Determining the Growth Status of the Plant on the Basis of Two or More Time-Dependent Results Include the Following Methods:

(1) The growth status of the plant is determined to be favorable when the two or more time-dependent diagnosis results about the particular nutrient show that the particular nutrient is sufficient at all the points in time. In this case, it can be predicted that the plant is capable of high future growth by maintaining the status.

(2) The growth status of the plant is determined to tend to improve when the two or more time-dependent diagnosis results about the particular nutrient show that the status of the particular nutrient has been shifted from insufficiency to sufficiency. In this case, it can be predicted that the plant is capable of high future growth by maintaining the improved status.

(3) The growth status of the plant is determined to tend to deteriorate when the two or more time-dependent diagnosis results about the particular nutrient show that the status of the particular nutrient has been shifted from sufficiency to insufficiency. In this case, it can be predicted that the plant has lower future growth unless appropriate action is taken, such as the application of an additional fertilizer rich in the nutrient.

(4) The growth status of the plant is determined to be poor when the two or more time-dependent diagnosis results about the particular nutrient show that the particular nutrient is insufficient at all the points in time. In this case, it can be predicted that the plant has much lower future growth or may die in some cases unless appropriate action is immediately taken, such as the application of an additional fertilizer rich in the nutrient.

6. Method for Determining Amount of Particular Nutrient Applied

One aspect of the present invention is a method for determining the amount of a particular nutrient applied. This method comprises determining the future amount of the particular nutrient that should be provided to a test plant, i.e., increase or decrease of or maintenance of the amount of the particular nutrient applied, on the basis of a diagnosis result obtained by the method for diagnosing the nutritional status or a determination result obtained by the method for determining the growth status in relation to the particular nutrient in the test plant.

The particular nutrient in the test plant is insufficient when a diagnosis result showing that the particular nutrient tends to be insufficient is obtained by the method of the paragraph "4. Method for diagnosing nutritional status of plant". Thus, it is not desirable for the growth of the test plant to maintain this status. In this case, the amount of the particular nutrient applied should be increased to more than the amount of the particular nutrient applied immediately before the diagnosis. By contrast, the present amount of the particular nutrient in the test plant is appropriate when a diagnosis result showing that the particular nutrient is sufficient is obtained by the diagnosis method. It is thus desirable for the growth of the test plant to maintain this status. In this case, the amount of the particular nutrient applied for subsequent fertilization can be kept at the amount of the particular nutrient applied immediately before the diagnosis.

Alternatively, the method of the paragraph "5. Method for determining growth status of plant" comprises determining the tendency of the present nutritional status on the basis of change in the nutritional status of a particular nutrient in a test plant from the past to present in consideration of a time-dependent factor. Thus, the amount of the particular nutrient applied can be determined more accurately by the method for determining the amount of a particular nutrient applied on the basis of a determination result of this method than by the preceding method for determining the amount of a particular nutrient applied on the basis of a diagnosis result of the method for diagnosing the nutritional status.

Specifically, for example, the diagnosis result obtained by the method of the present invention for diagnosing the nutritional status of a plant may show sufficiency as the present nutritional status in relation to the particular nutrient in the test plant. Even in this case, when the status of the particular nutrient has been shifted to insufficiency compared with the past diagnosis result from the test plant, the growth of the test plant deteriorates by continuing the status in the future. In such a case, the amount of the particular nutrient applied is returned to the amount of the particular nutrient applied immediately before a diagnosis that has produced a diagnosis result showing the highest sufficiency. Alternatively, the amount of the particular nutrient applied is increased to more than the amount of the particular nutrient applied that has been constant among diagnoses. Moreover, all of the past and present diagnosis results about the particular nutrient may show that the particular nutrient tends to be insufficient. Even in this case, as long as the status of the particular nutrient has been shifted to sufficiency in the present diagnosis result compared with the past diagnosis result, the growth status of the test plant tends to improve. Thus, the amount of the particular nutrient applied immediately before the latest diagnosis can be maintained, rather than the amount of the particular nutrient applied is immediately increased. Furthermore, the amount of the particular nutrient in the test plant is appropriate from the past to present when the two or more time-dependent diagnosis results about the particular nutrient show that the particular nutrient is sufficient at the same level at all the points in time. It is thus desirable for the growth of the test plant to maintain this amount of the particular nutrient applied. By contrast, the amount of the particular nutrient in the test plant is insufficient when the two or more time-dependent diagnosis results about the particular nutrient show that the particular nutrient tends to be insufficient from the past to present without improvement or more strongly tends to be insufficient. The growth of the test plant deteriorates by continuing this state in the future. It is thus desirable for the growth of the test plant to perform fertilization in the amount of the particular nutrient applied much larger than the amount of the particular nutrient applied immediately before a diagnosis that has produced a diagnosis result close to the highest sufficiency.

For performing this embodiment, note that a performer records, in advance on a diagnosis-by-diagnosis basis, the amount of a particular nutrient provided to a test plant immediately before each diagnosis, before diagnosing the test plant by the method of the present invention for diagnosing the nutritional status.

EXAMPLES

Example 1

Selection of Marker for Diagnosis of Nutritional Status

Markers for diagnosis of the nutritional status of *Eucalyptus globulus* (hereinafter, simply referred to as "*Eucalyptus*" in all Examples for the sake of convenience) were selected with nitrogen as a particular nutrient by a method of the present invention for selecting a marker for diagnosis of the nutritional status.

1. Preparation of Nitrogen-Deficient *Eucalyptus*

16 individuals of Eucalyptus of approximately 30 to 50 cm in height were hydroponically cultured for 1 month in each of 3 test systems shown in Table 1, i.e., under each of 3 nutritional conditions differing in nitrogen concentration (hydroponic solution I: 4000 μM $NO_3$ hydroponic solution, hydroponic solution II: 40 μM $NO_3$ hydroponic solution, and hydroponic solution III: 0 μM $NO_3$ hydroponic solution). The hydroponic culture conditions involved solution volume: approximately 50 L, hydroponic solution temperature: approximately 22 to 24° C., hydroponic solution pH: 4.0 to 6.0, electric conductivity: 0.5 to 0.7 mS/cm maintained at all times using a hydroponic culture apparatus for research (manufactured by M Hydroponic Research Co., Ltd.) as a hydroponic culture apparatus. Reagents in the hydroponic solutions do not cause concentration gradients because the hydroponic solutions are circulated using pumps. Also, an aerobic environment is constantly maintained because air is incorporated in the hydroponic solutions during the circulation.

TABLE 1

Composition of hydroponic solution

| Reagent | Hydroponic solution I | Hydroponic solution II | Hydroponic solution III |
|---|---|---|---|
| $(NH_4)_2SO_4$ | 400 | 4 | 0 |
| $Ca(NO_3)_2 \cdot 4H_2O$ | 4000 | 40 | 0 |
| KCl | 2000 | 2000 | 2000 |
| $NaH_2PO_4 \cdot 2H_2O$ | 2000 | 2000 | 2000 |
| $CaCl_2 \cdot 2H_2O$ | 0 | 3960 | 4000 |
| $MgSO_4 \cdot 7H_2O$ | 2000 | 2000 | 2000 |
| $CuSO_4 \cdot 5H_2O$ | 0.16 | 0.16 | 0.16 |
| $(NH_4)_6Mo_7 \cdot O_{24}$ | 0.011 | 0.011 | 0.011 |
| Fe(III)-EDTA | 26.8 | 26.8 | 26.8 |
| $CuSO_4 \cdot 5H_2O$ | 0.16 | 0.16 | 0.16 |
| $(NH_4)_6Mo_7 \cdot O_{24}$ | 0.011 | 0.011 | 0.011 |
| $MnCl_2 \cdot 4H_2O$ | 4.5 | 4.5 | 4.5 |
| $ZnSO_4 \cdot 7H_2O$ | 0.4 | 0.4 | 0.4 |
| $H_3BO_4$ | 18 | 18 | 18 |

(Unit: μM)

2. Sampling of Leaves

Seven per test system were randomly selected from the Eucalyptus individuals cultured in each of the 3 test systems. Healthy leaves were selected from each individual and cut at the petiolar part with scissors. The main veins were removed from the collected leaves, and each residue was immediately added into liquid nitrogen to stop vital reaction. The leaf sample was placed in a 2.0-ml plastic tube and stored in a deep freezer of −80° C. until just before use.

3. Extraction of Extract

Approximately 50 mg (fresh weight) of the frozen *Eucalyptus* leaf sample was weighed into a safe-lock tube. Zirconia balls of 5 mm in diameter (Tosoh Corp.) were added to the tube, and the leaf sample was pulverized (25 Hz, 30 sec.) using TissueLyser II (Qiagen). Subsequently, 300 μl of 80% methanol (Wako Pure Chemical Industries, Ltd.) containing 10 μg/ml formononetin (Funakoshi Co., Ltd.) was added to the tube, which was then shaken at 25 Hz for 120 seconds using TissueLyser II to extract metabolites. The extraction solution was centrifuged at 12000×g for 10 minutes. Then, approximately 1 ml of the supernatant was placed in a 1-ml Terumo syringe (Terumo Corp.). After filtration through Millex-LG (Millipore Corp.), the extraction solution was transferred to a glass vial (Dionex Japan).

4. LC-MS Analysis and LC-MS/MS Analysis

A 2 μl aliquot of the obtained extraction solution was analyzed by LC-MS and LC-MS/MS under analysis conditions shown below. Specific analysis methods followed instruction manuals included.

(Liquid Chromatography Conditions)

Equipment used: UFLC (Shimadzu Corp.)

Eluent A: Water for chromatography LiChrosolv (Merck Chemicals) containing 0.1% formic acid (Wako Pure Chemical Industries, Ltd.)

Eluent B: Acetonitrile hypergrade for LC-MS LiChrosolv (Merck Chemicals) containing 0.1% formic acid (Wako Pure Chemical Industries, Ltd.)

Column: TSKgel ODS-100V 4.6×250 mm, particle: 5 μm (Tosoh Corp.)

Guard column: TSKguardgel ODS-100V, particle: 5 μm (Tosoh Corp.)

Column temperature: 40° C.

Flow rate: 0.5 ml/min

Time-scheduled gradient B %

0 min: 3%, 45 min: 97%, 50 min: 97%, 50.1: 3%, 57 min: 3%

(MS Conditions)
 Equipment used: 3200QTRAP (Applied Biosystems)
 Mass range: 100 to 1000
 Scan mode: Enhanced Mass Scan
 Scan rate: 4000 amu/sec
 Analysis software: Analyst 1.4.2 (Applied Biosystems)
(MSMS Conditions)
 Equipment used: 3200QTRAP (Applied Biosystems)
 Mass range: 50-1000
 Scan mode: Enhanced Product Ion Scan
 Scan rate: 4000 amu/sec
 Analysis software: Analyst 1.4.2 (Applied Bio systems)
Alignment of Metabolite Data: MarkerView™ 1.1 Software (Applied Biosystems)
(Alignment Conditions)
 Tolerance of elution time: 1 min.
 Tolerance of mass: 25 ppm
 Intensity threshold: 10,000

5. Selection of Marker for Diagnosis of Nutritional Status

Metabolites (biomarkers) confirmed to be quantitatively changed in response to the amount of nitrogen in a hydroponic medium were selected as follows using GeneSpring MS (Agilent Technologies, Inc.).

(1) Two-group comparison (volcano plot) was performed between 7 Eucalyptus individuals cultured in the hydroponic solution III (0 μM NO3) and 7 *Eucalyptus* individuals cultured in the hydroponic solution I (4000 μM NO3) to select, as first marker candidates, metabolites that exhibited an accumulation differing by two or more times or by ½ or less between two test sections with a statistically significant difference (P<0.05).

(2) Two-group comparison (volcano plot) was performed between 7 Eucalyptus individuals cultured in the hydroponic solution II (40 μM NO3) and 7 Eucalyptus individuals cultured in the hydroponic solution I (4000 μM NO3) to select, as second marker candidates, metabolites with a statistically significant difference between these two groups.

(3) Common metabolites in both of the first marker candidates of (1) and the second marker candidates of (2) were selected as markers for diagnosis of the nutritional status of Eucalyptus in relation to nitrogen.

6. Results

Figure 3A:
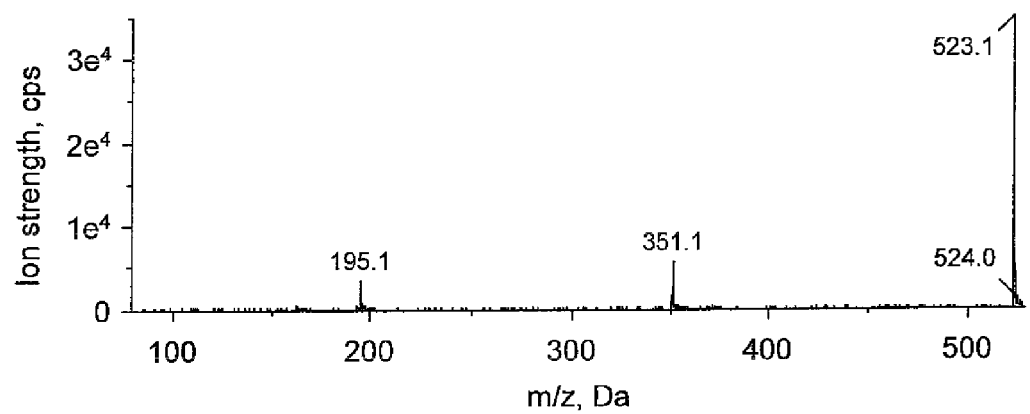
FIG. 3a shows examples (1) of mass spectra of markers for diagnosis of the nitrogen status of *Eucalyptus globulus* obtained by a method of the present invention for selecting a marker for nutritional diagnosis.
Figure 3A:
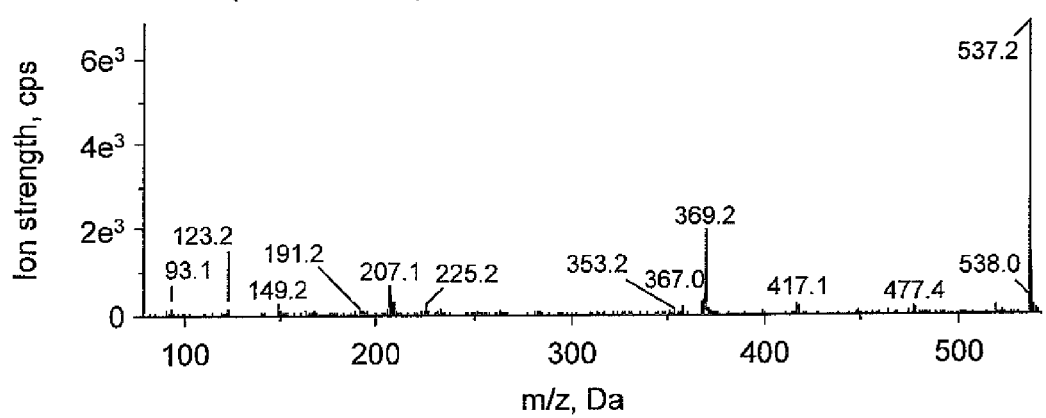
Figure 3B:
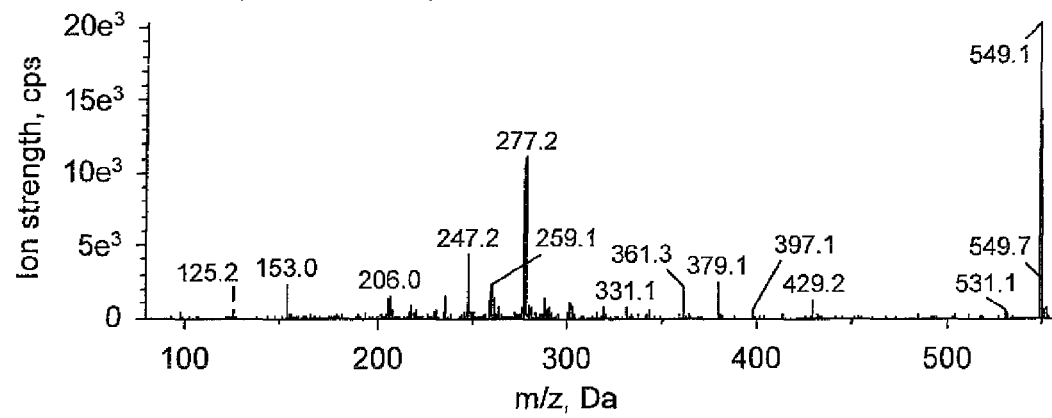
FIG. 3b shows examples (2) of mass spectra of markers for diagnosis of the nitrogen status of *Eucalyptus globulus* obtained by the method of the present invention for selecting a marker for nutritional diagnosis.
Figure 3B:
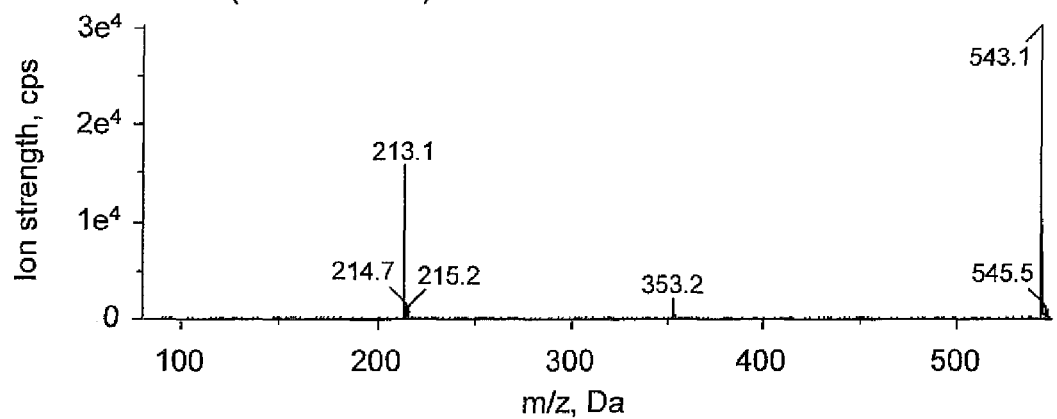
Figure 3C:
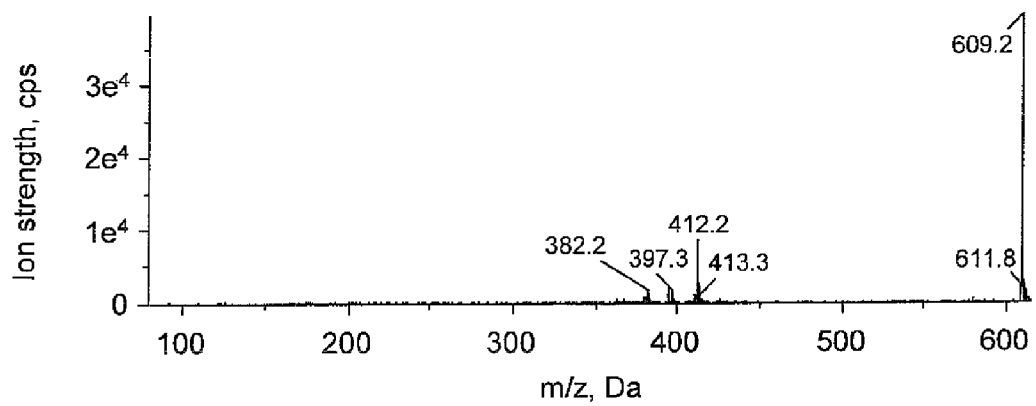
FIG. 3c shows examples (3) of mass spectra of markers for diagnosis of the nitrogen status of *Eucalyptus globulus* obtained by the method of the present invention for selecting a marker for nutritional diagnosis.
Figure 3C:
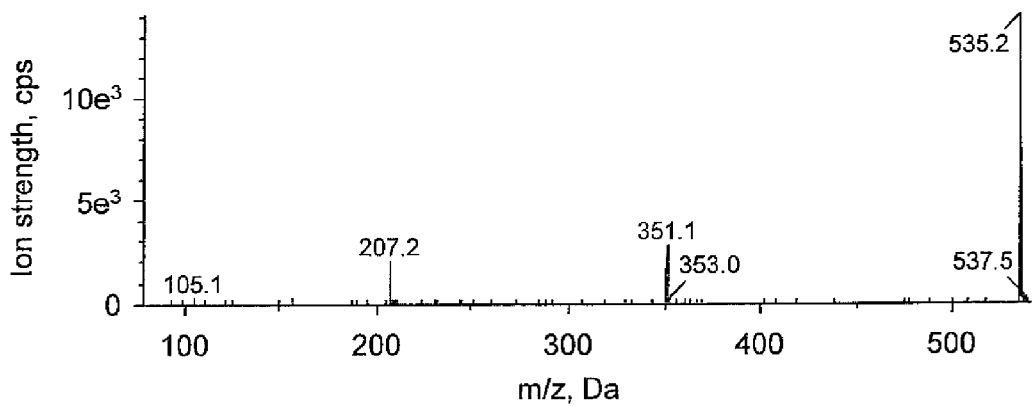

According to the method (1) of the present invention for selecting a marker for diagnosis of the nutritional status, both of the first and second marker candidates can serve as markers for diagnosis of the nutritional status. Thus, 312 metabolites shown in Table 2 were selected as markers for diagnosis of the nitrogen status of Eucalyptus. Of them, the markers of Mass Nos. 271 to 273 were obtained as markers for diagnosis of the nitrogen status belonging to only the second marker candidates. Also, the markers of Mass Nos. 274 to 312 were obtained as markers for diagnosis of the nitrogen status belonging to only the first marker candidates. According to the method (2) of the present invention for selecting a marker for diagnosis of the nitrogen status, the markers of Mass Nos. 1 to 270 are common markers for diagnosis of the nitrogen status in the first and second marker candidates. In Table 2, each marker is indicated in measured values (retention time and mass-to-charge ratio) of LC-MS. Moreover, the mass spectra of some (Mass Nos. 29, 46, 63, 69, 110, and 140) of the markers for diagnosis of the nitrogen status obtained in this Example are shown in FIGS. 3a to 3c as an example.

TABLE 2

| Mass No. | Retention time (min.) | Mass (m/z) |
|---|---|---|
| 1 | 25.36 | 789.6 |
| 2 | 25.29 | 788.5 |
| 3 | 25.29 | 789.0 |
| 4 | 25.24 | 790.0 |
| 5 | 25.22 | 801.5 |
| 6 | 21.20 | 441.4 |
| 7 | 25.21 | 802.4 |
| 8 | 25.35 | 532.3 |
| 9 | 25.23 | 802.0 |
| 10 | 25.25 | 802.9 |
| 11 | 44.70 | 481.3 |
| 12 | 25.36 | 790.6 |
| 13 | 28.39 | 574.2 |
| 14 | 21.81 | 611.4 |
| 15 | 26.72 | 609.4 |
| 16 | 15.84 | 804.7 |
| 17 | 25.29 | 532.7 |
| 18 | 25.29 | 803.4 |
| 19 | 21.79 | 549.2 |
| 20 | 25.27 | 780.6 |
| 21 | 25.33 | 781.6 |
| 22 | 28.11 | 573.2 |
| 23 | 26.15 | 542.4 |
| 24 | 25.32 | 524.6 |
| 25 | 28.17 | 574.3 |
| 26 | 28.32 | 833.4 |
| 27 | 28.41 | 573.4 |
| 28 | 25.30 | 525.4 |
| 29 | 27.71 | 523.3 |
| 30 | 27.42 | 585.4 |
| 31 | 25.69 | 639.2 |
| 32 | 26.07 | 541.3 |
| 33 | 25.28 | 536.4 |
| 34 | 25.36 | 537.4 |
| 35 | 25.28 | 535.3 |
| 36 | 27.18 | 603.4 |
| 37 | 27.25 | 563.4 |
| 38 | 16.88 | 888.6 |
| 39 | 25.28 | 536.5 |
| 40 | 17.17 | 880.2 |
| 41 | 15.84 | 805.2 |
| 42 | 26.44 | 835.6 |
| 43 | 15.76 | 797.3 |
| 44 | 27.25 | 586.3 |
| 45 | 21.79 | 550.2 |
| 46 | 26.63 | 537.4 |
| 47 | 15.83 | 796.6 |
| 48 | 28.16 | 517.2 |
| 49 | 28.14 | 565.2 |
| 50 | 28.15 | 566.4 |
| 51 | 23.26 | 627.4 |
| 52 | 24.34 | 574.9 |
| 53 | 24.46 | 577.3 |
| 54 | 23.55 | 541.4 |
| 55 | 25.27 | 814.6 |
| 56 | 24.38 | 546.5 |
| 57 | 16.72 | 804.4 |
| 58 | 28.14 | 557.3 |
| 59 | 23.62 | 461.3 |
| 60 | 28.36 | 575.4 |
| 61 | 25.24 | 538.4 |
| 62 | 28.39 | 551.4 |
| 63 | 22.52 | 549.2 |
| 64 | 27.73 | 545.4 |
| 65 | 25.28 | 551.3 |
| 66 | 16.52 | 881.2 |
| 67 | 25.28 | 532.4 |
| 68 | 23.23 | 627.4 |
| 69 | 26.30 | 543.4 |
| 70 | 15.81 | 805.1 |
| 71 | 28.12 | 558.2 |
| 72 | 27.23 | 545.4 |
| 73 | 26.61 | 544.4 |
| 74 | 26.09 | 586.4 |
| 75 | 21.17 | 442.2 |
| 76 | 27.75 | 673.4 |
| 77 | 28.02 | 473.4 |
| 78 | 16.78 | 880.1 |

TABLE 2-continued

| Mass No. | Retention time (min.) | Mass (m/z) |
|---|---|---|
| 79 | 27.70 | 524.3 |
| 80 | 27.63 | 545.4 |
| 81 | 21.78 | 612.2 |
| 82 | 16.60 | 872.2 |
| 83 | 27.20 | 546.2 |
| 84 | 23.93 | 629.3 |
| 85 | 23.97 | 541.4 |
| 86 | 26.92 | 551.3 |
| 87 | 27.02 | 536.3 |
| 88 | 28.22 | 559.3 |
| 89 | 27.31 | 564.5 |
| 90 | 16.50 | 873.1 |
| 91 | 19.49 | 623.5 |
| 92 | 28.19 | 518.3 |
| 93 | 25.08 | 629.4 |
| 94 | 15.83 | 796.4 |
| 95 | 25.32 | 629.4 |
| 96 | 24.34 | 575.9 |
| 97 | 24.38 | 546.7 |
| 98 | 26.80 | 597.4 |
| 99 | 17.35 | 881.3 |
| 100 | 21.28 | 442.3 |
| 101 | 17.48 | 880.6 |
| 102 | 15.88 | 838.6 |
| 103 | 25.32 | 553.3 |
| 104 | 23.20 | 628.3 |
| 105 | 28.68 | 494.8 |
| 106 | 27.81 | 674.6 |
| 107 | 26.00 | 539.2 |
| 108 | 28.83 | 545.3 |
| 109 | 20.61 | 427.3 |
| 110 | 26.11 | 609.4 |
| 111 | 23.92 | 629.4 |
| 112 | 26.61 | 543.4 |
| 113 | 34.37 | 519.4 |
| 114 | 21.83 | 628.2 |
| 115 | 24.35 | 759.5 |
| 116 | 28.04 | 623.4 |
| 117 | 28.50 | 543.1 |
| 118 | 27.00 | 543.2 |
| 119 | 24.05 | 541.4 |
| 120 | 28.82 | 563.2 |
| 121 | 22.98 | 545.2 |
| 122 | 21.14 | 768.5 |
| 123 | 26.57 | 544.3 |
| 124 | 19.48 | 624.4 |
| 125 | 21.83 | 551.3 |
| 126 | 19.25 | 805.3 |
| 127 | 19.89 | 808.3 |
| 128 | 26.06 | 603.2 |
| 129 | 25.30 | 630.4 |
| 130 | 24.35 | 546.8 |
| 131 | 21.77 | 441.2 |
| 132 | 27.69 | 763.6 |
| 133 | 21.85 | 532.3 |
| 134 | 25.43 | 571.3 |
| 135 | 27.46 | 549.4 |
| 136 | 37.64 | 515.2 |
| 137 | 24.34 | 521.3 |
| 138 | 28.21 | 503.3 |
| 139 | 26.40 | 572.6 |
| 140 | 26.95 | 535.3 |
| 141 | 27.48 | 523.2 |
| 142 | 19.71 | 605.3 |
| 143 | 15.83 | 865.7 |
| 144 | 23.30 | 545.3 |
| 145 | 27.04 | 547.3 |
| 146 | 27.76 | 689.5 |
| 147 | 21.89 | 627.5 |
| 148 | 28.69 | 607.3 |
| 149 | 15.63 | 806.4 |
| 150 | 26.61 | 553.3 |
| 151 | 27.86 | 667.3 |
| 152 | 28.01 | 519.2 |
| 153 | 26.15 | 587.3 |
| 154 | 27.26 | 601.3 |
| 155 | 43.38 | 483.4 |
| 156 | 22.93 | 658.4 |
| 157 | 28.61 | 589.3 |
| 158 | 26.05 | 443.4 |
| 159 | 24.36 | 522.4 |
| 160 | 15.87 | 729.2 |
| 161 | 10.02 | 423.1 |
| 162 | 33.14 | 455.3 |
| 163 | 16.64 | 409.2 |
| 164 | 37.63 | 763.6 |
| 165 | 44.97 | 679.7 |
| 166 | 26.38 | 433.3 |
| 167 | 15.33 | 433.0 |
| 168 | 25.00 | 433.2 |
| 169 | 27.36 | 432.2 |
| 170 | 24.77 | 472.3 |
| 171 | 42.75 | 991.4 |
| 172 | 22.12 | 379.2 |
| 173 | 24.74 | 471.5 |
| 174 | 37.53 | 764.5 |
| 175 | 15.84 | 367.4 |
| 176 | 11.14 | 434.3 |
| 177 | 22.06 | 397.9 |
| 178 | 43.03 | 759.6 |
| 179 | 15.74 | 433.2 |
| 180 | 26.17 | 319.3 |
| 181 | 6.24 | 448.1 |
| 182 | 32.03 | 455.5 |
| 183 | 27.58 | 433.3 |
| 184 | 25.98 | 624.2 |
| 185 | 35.71 | 531.4 |
| 186 | 24.28 | 432.7 |
| 187 | 28.55 | 714.5 |
| 188 | 24.99 | 344.2 |
| 189 | 7.92 | 433.1 |
| 190 | 26.03 | 624.8 |
| 191 | 29.92 | 731.5 |
| 192 | 6.59 | 434.2 |
| 193 | 27.58 | 432.4 |
| 194 | 3.49 | 432.8 |
| 195 | 6.08 | 414.1 |
| 196 | 32.74 | 693.5 |
| 197 | 26.02 | 433.3 |
| 198 | 42.87 | 763.6 |
| 199 | 26.40 | 328.2 |
| 200 | 38.13 | 693.5 |
| 201 | 3.59 | 432.8 |
| 202 | 44.42 | 431.3 |
| 203 | 14.08 | 417.1 |
| 204 | 22.06 | 398.2 |
| 205 | 44.10 | 764.5 |
| 206 | 37.90 | 599.5 |
| 207 | 28.54 | 433.0 |
| 208 | 31.95 | 682.4 |
| 209 | 37.86 | 600.5 |
| 210 | 38.44 | 811.6 |
| 211 | 22.10 | 397.2 |
| 212 | 22.38 | 387.2 |
| 213 | 13.96 | 417.1 |
| 214 | 6.06 | 462.1 |
| 215 | 26.74 | 434.0 |
| 216 | 44.06 | 763.6 |
| 217 | 32.03 | 681.5 |
| 218 | 44.09 | 431.3 |
| 219 | 39.61 | 527.4 |
| 220 | 41.24 | 513.2 |
| 221 | 37.95 | 797.6 |
| 222 | 38.30 | 863.8 |
| 223 | 28.15 | 433.3 |
| 224 | 24.99 | 343.3 |
| 225 | 35.43 | 795.5 |
| 226 | 37.42 | 666.5 |
| 227 | 33.01 | 679.4 |
| 228 | 10.02 | 615.1 |
| 229 | 40.68 | 942.6 |
| 230 | 39.61 | 584.5 |
| 231 | 44.35 | 846.7 |
| 232 | 44.39 | 845.5 |
| 233 | 42.78 | 511.3 |
| 234 | 39.92 | 761.6 |

TABLE 2-continued

| Mass No. | Retention time (min.) | Mass (m/z) |
|---|---|---|
| 235 | 39.82 | 763.6 |
| 236 | 6.58 | 433.1 |
| 237 | 39.65 | 526.9 |
| 238 | 5.67 | 433.2 |
| 239 | 28.62 | 713.4 |
| 240 | 6.35 | 433.8 |
| 241 | 37.36 | 665.5 |
| 242 | 39.54 | 583.6 |
| 243 | 32.73 | 827.5 |
| 244 | 6.15 | 433.9 |
| 245 | 43.19 | 775.6 |
| 246 | 40.15 | 463.3 |
| 247 | 39.65 | 538.4 |
| 248 | 39.65 | 600.4 |
| 249 | 40.57 | 471.4 |
| 250 | 44.71 | 862.6 |
| 251 | 43.14 | 776.5 |
| 252 | 39.72 | 599.4 |
| 253 | 32.04 | 553.3 |
| 254 | 14.02 | 541.1 |
| 255 | 45.00 | 749.6 |
| 256 | 40.14 | 910.6 |
| 257 | 35.04 | 699.5 |
| 258 | 40.14 | 909.6 |
| 259 | 40.85 | 941.5 |
| 260 | 44.42 | 861.7 |
| 261 | 38.25 | 779.5 |
| 262 | 39.65 | 554.4 |
| 263 | 44.99 | 748.6 |
| 264 | 44.97 | 747.6 |
| 265 | 39.68 | 537.4 |
| 266 | 39.62 | 553.4 |
| 267 | 32.96 | 698.5 |
| 268 | 37.95 | 796.6 |
| 269 | 32.98 | 697.6 |
| 270 | 38.00 | 795.6 |
| 271 | 32.66 | 569.5 |
| 272 | 39.68 | 534.4 |
| 273 | 39.61 | 791.6 |
| 274 | 23.62 | 461.3 |
| 275 | 21.17 | 442.2 |
| 276 | 26.92 | 551.3 |
| 277 | 19.49 | 623.5 |
| 278 | 28.19 | 518.3 |
| 279 | 21.28 | 442.3 |
| 280 | 24.35 | 759.5 |
| 281 | 24.05 | 541.4 |
| 282 | 22.98 | 545.2 |
| 283 | 19.48 | 624.4 |
| 284 | 21.77 | 441.2 |
| 285 | 25.43 | 571.3 |
| 286 | 27.46 | 549.4 |
| 287 | 37.64 | 515.2 |
| 288 | 28.21 | 503.3 |
| 289 | 19.71 | 605.3 |
| 290 | 23.30 | 545.3 |
| 291 | 27.76 | 689.5 |
| 292 | 21.89 | 627.5 |
| 293 | 28.69 | 607.3 |
| 294 | 27.86 | 667.3 |
| 295 | 28.01 | 519.2 |
| 296 | 43.38 | 483.4 |
| 297 | 22.93 | 658.4 |
| 298 | 28.61 | 589.3 |
| 299 | 10.02 | 423.1 |
| 300 | 33.14 | 455.3 |
| 301 | 26.38 | 433.3 |
| 302 | 15.33 | 433.0 |
| 303 | 25.00 | 433.2 |
| 304 | 27.36 | 432.2 |
| 305 | 24.77 | 472.3 |
| 306 | 22.12 | 379.2 |
| 307 | 24.74 | 471.5 |
| 308 | 11.14 | 434.3 |
| 309 | 22.06 | 397.9 |
| 310 | 15.74 | 433.2 |
| 311 | 26.17 | 319.3 |
| 312 | 27.58 | 433.3 |

Example 2

Diagnosis of Nitrogen Status Using Markers for Diagnosis of Nitrogen Status

The markers for diagnosis of the nitrogen status of *Eucalyptus* obtained in Example 1 were used to diagnose the nitrogen status of test *Eucalyptus* for diagnosis of the nitrogen status.

1. Culture of Test *Eucalyptus*

21 individuals of *Eucalyptus* shoots of approximately 45 cm in average height were planted at 1 individual/pot in pots each containing 10 L of soil consisting of 4 L of mountain soil, 3 L of peat moss (FIBROSOIL), 2 L of vermiculite (Hattori Co., Ltd.), and 1 L of Venuslite (Fuyo Perlite Co., Ltd.) and cultured in a field environment for 3 months. During this period, the shoots were sprinkled twice a day (morning and evening) with approximately 500 ml of water per pot. These 21 individuals were divided into 3 groups each involving 7 individuals. 50 g (5 g/L soil) of High Control fertilizer (Chisso Asahi Fertilizer Co., Ltd.) was added to group A. 50 g (5 g/L soil) of Long Max fertilizer (Kuki Fertilizer Ind. Co., Ltd.) was added to group B. Group C was not fertilized.

2. Sampling of Leaves, Metabolite Extraction, and LC-MS Analysis

On the first and second months of planting, each test *Eucalyptus* was subjected to sampling of leaves, metabolite extraction, and LC-MS analysis in the same way as in Example 1.

3. Diagnosis of nitrogen status using markers for diagnosis of nitrogen status

After data alignment of metabolite s among samples using Marker View™ 1.1 Software, the nitrogen status of the test *Eucalyptus* was analyzed on the basis of information on markers for diagnosis of the nitrogen status using GeneSpring MS. Specifically, according to Class Prediction of GeneSpring MS, information on markers for diagnosis of the nitrogen status of field-cultured *Eucalyptus* was compared with that on the markers for diagnosis of the nitrogen status of Eucalyptus hydroponically cultured under each of 3 nitrogen conditions in Example 1, to determine that the information on markers for diagnosis of the nitrogen status of the test *Eucalyptus* was closest to the information on markers for diagnosis of the nitrogen status from any one of the 3 hydroponic media. Markers of Mass. Nos. 1-270 in Table 2 were used as markers for diagnosis of the nitrogen status. Analysis conditions are as follows:

Calculation algorithm: Support Vector Machines
Kernel Function Polynomial Dot Product (Order I)
Marker set: markers for diagnosis of the nitrogen status of *Eucalyptus globulus*
Test Sample: 21 individuals of test *Eucalyptus globulus*
Training Sample: *Eucalyptus globulus* hydroponically cultured under each of 3 nutritional conditions in Example 1 (hydroponic medium 1-cultured *Eucalyptus*, hydroponic medium II-cultured *Eucalyptus*, and hydroponic medium III-cultured *Eucalyptus*)

4. Results

The diagnosis results are shown in FIG. 1. The diagnostic patterns were classified into the following 3 groups.

Group 1: On both the first and second months of planting, 6 individuals were determined to have the same nitrogen status as that in the hydroponic solution I described in Example 1. All of these individuals were derived from group A, showing that most of the individuals in group A maintained the favorable nitrogen status on both the first and second months of planting.

Group 2: 8 individuals were determined to have the same nitrogen status as that in the hydroponic solution I described in Example 1 on the first month of planting, but have the same nitrogen status as that in the hydroponic solution II described in Example 1 on the second month of planting. One of them was derived from group A, and all of the remaining individuals were derived from group B, showing that the nitrogen status of this group was favorable at the beginning of planting, but deteriorated from about 1 month of planting. These results demonstrated that the amount of nitrogen in 50 g of Long Max fertilizer was insufficient for raising *Eucalyptus* for 2 months or longer in the preferable growth status.

Group 3: 7 individuals corresponded to this group, which were determined to have the same nitrogen status as that in the hydroponic solution II described in Example 1 on both the first and second months of planting. All of the individuals in this group had the poor nitrogen status from the beginning of planting and were derived from group C. Group C was deficient in nitrogen without being fertilized and was thus demonstrated to be consistent with the diagnosis result.

Example 3

Relationship of Growth Status with Nitrogen Status Diagnosis Result Obtained Using Markers for Diagnosis of Nitrogen Status Each group classified using the markers for diagnosis of the nitrogen status in Example 2 was tested to verify whether or not its diagnosis result correlated to the future growth status based on the diagnosis result.

Figure 2:
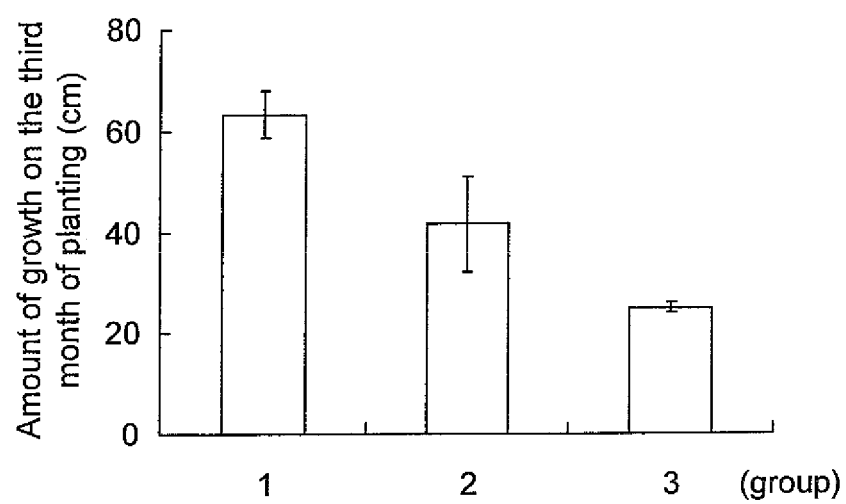
FIG. 2 is a diagram showing the amount of growth of each group on the third month of planting.

The average amount of growth on the third month of planting (average of values determined by subtracting the height at the time of planting from the height on the third month) was measured for each of groups 1 to 3 classified in Example 2. As a result, the average amount of growth was confirmed to be from highest to lowest in groups 1, 2, and 3 in this order (FIG. 2). Specifically, group 1 diagnosed in Example 2 as having the favorable nitrogen status grew by 60 cm in terms of the average amount of growth and thus exhibited the most favorable future growth. Moreover, group 2 diagnosed in Example 2 as having the nitrogen status deteriorating from about 1 month of planting grew by 40 cm in terms of the average amount of growth and was thus slightly inferior in future growth to group 1. On the other hand, group 3 diagnosed in Example 2 as having the poor nitrogen status grew by 20 cm in terms of the average amount of growth and was thus demonstrated to have the poorest future growth.

These results demonstrated that the future growth status of a plant can be predicted from a nitrogen status diagnosis result obtained using the marker for diagnosis of the nitrogen status of the present invention, when the nitrogen status is maintained. Hence, the future growth status of a plant diagnosed as having the poor nutritional status of a particular nutrient by the diagnosis method of the present invention can be improved by applying thereto an additional fertilizer on the basis of the diagnosis result. Thus, the plant of interest can be provided with necessary nutrients in appropriate amounts when necessary by regularly performing the method of the present invention for diagnosing the nutritional status of a particular nutrient.

Example 4

Diagnosis of Nitrogen Status of *Eucalyptus* Cultured Under Different Environmental Condition Using Markers for Diagnosis of Nitrogen Status To verify that the status of a particular nutrient in a plant could be diagnosed, without being influenced by various stresses, using the markers for diagnosis of the nutritional status obtained by the method of the present invention selecting a marker for diagnosis of the nutritional status, the markers for diagnosis of the nitrogen status of *Eucalyptus* obtained in Example 1 were used to diagnose the nitrogen status of test *Eucalyptus* cultured environmental conditions different from those of Example 2.

1. Culture of Test *Eucalyptus*

6 individuals of *Eucalyptus* shoots of approximately 50 cm in average height were planted at 1 individual/pot on May 7, 2009 in pots each containing 10 L of mountain sand and cultured in a field environment for 3 months. These 6 individuals were divided into 2 groups each involving 3 individuals. 200 g (20 g/L soil) of High Control fertilizer (Chisso Asahi Fertilizer Co., Ltd.) was added to group A'. This was the same nutritional condition as that for group A in Example 2. Group B' was not fertilized. This was the same nutritional condition as that for group C in Example 2.

2. Sampling of Leaves, Metabolite Extraction, LC-MS Analysis, and Diagnosis of Nitrogen Status On the first and second months of planting, each test *Eucalyptus* was subjected to sampling of leaves, metabolite extraction, LC-MS analysis, and diagnosis of the nitrogen status using the markers for diagnosis of the nitrogen status in the same way as in Example 2. The same markers as those in Example 2 were used as markers for diagnosis of the nitrogen status.

Differences in weather conditions and soil conditions between Example 2 and this Example are shown in Tables 3 and 4, respectively. Example 2 and this Example differ in year in which the test was conducted (2008 and 2009, respectively). According to weather data on the *Eucalyptus* culture test site and its neighborhood, the amount of waterfall largely differed between 2008 and 2009 (Table 3). Moreover, the soil used in pot culture in Example 2 was general soil (Table 4) and was thus water-retentive, whereas the soil used in pot culture in this Example was 100% mountain sand and was thus hardly water-retentive. Thus, the soil used in this Example differs therefrom in that: the large part of the soil surface was dry even when sprinkled with water; and the soil contained few nutrients. In this way, this Example and Example 2 differ in time conditions, soil conditions, weather conditions, etc. Hence, the individuals in both of these Examples were placed under different environmental stresses.

TABLE 3

Amount of waterfall and average air temperature in 2008 and 2009 in Kameyama city

| Year | Month | Amount of waterfall (mm) | Average air temperature (° C.) |
|------|-------|--------------------------|-------------------------------|
| 2008 | 5     | 298                      | 17.9                          |
|      | 6     | 359                      | 20.9                          |
|      | 7     | 115                      | 26.5                          |

TABLE 3-continued

Amount of waterfall and average air temperature in 2008 and 2009 in Kameyama city

| Year | Month | Amount of waterfall (mm) | Average air temperature (° C.) |
|---|---|---|---|
| 2009 | 5 | 153 | 18.6 |
|  | 6 | 221 | 21.7 |
|  | 7 | 237 | 25.0 |

(According to the Japan Meteorological Agency)

TABLE 4

Differences in composition of soil and amount of fertilizer added between Examples 2 and 4

|  | Example 2 | | Example 4 | |
|---|---|---|---|---|
| Year in which test was conducted | 2008 | | 2009 | |
| Composition of soil | Mountain soil | 4 L | Mountain sand | 10 L |
|  | Peat moss | 3 L |  |  |
|  | Vermiculite | 2 L |  |  |
|  | Venuslite | 1 L |  |  |
| Amount of fertilizer added | High Control | 50 g | High Control | 200 g |

3. Results

The diagnosis result of each *Eucalyptus* cultured under the conditions described above is shown in FIG. 4. The individuals were classified into the following 2 groups as a result of classification based on the diagnostic patterns (groups 1 to 3) of Example 2.

Group 1 (on both the first and second months of planting, determined to have the same nutritional status as that in the hydroponic solution 1): 3 individuals corresponded to this group. All of these individuals were derived from group N. The nutritional condition for group A' is the same as that for group A (6 out of 7 individuals belong to group 1) of Example 2.

Group 3 (on both the first and second months of planting, determined to have the same nutritional status as that in the hydroponic solution II): 3 individuals corresponded to this group. All of these individuals were derived from group B'. The nutritional condition for group B' is the same as that for group C (all of 7 individuals belong to group 3) of Example 2.

As described above, the respective nutritional statuses of the *Eucalyptus* individuals of Example 2 and this Example cultured under different conditions were diagnosed using the same markers for diagnosis of the nutritional status selected in Example 1. In comparison between their diagnosis results, both of these individuals produced almost the same diagnosis results about the nitrogen status, even though cultured under different conditions, i.e., placed under different stresses. These results demonstrated that by use of the marker for diagnosis of the nutritional status of the present invention, the status of a nutrient unique to the marker in a test plant can be diagnosed accurately without being influenced by various stresses based on a difference in culture environment.

Example 5

Relationship of Growth Status with Nitrogen Status Diagnosis Result Obtained Using Markers for Diagnosis of Nitrogen Status of *Eucalyptus* Cultured Under Different Environmental Condition Each group classified using the markers for diagnosis of the nitrogen status in relation to nitrogen in Example 4 was tested to verify whether or not the correlation of its diagnosis result to the future growth status based on the diagnosis result agreed with that in Examples 2 and 3.

Figure 5:
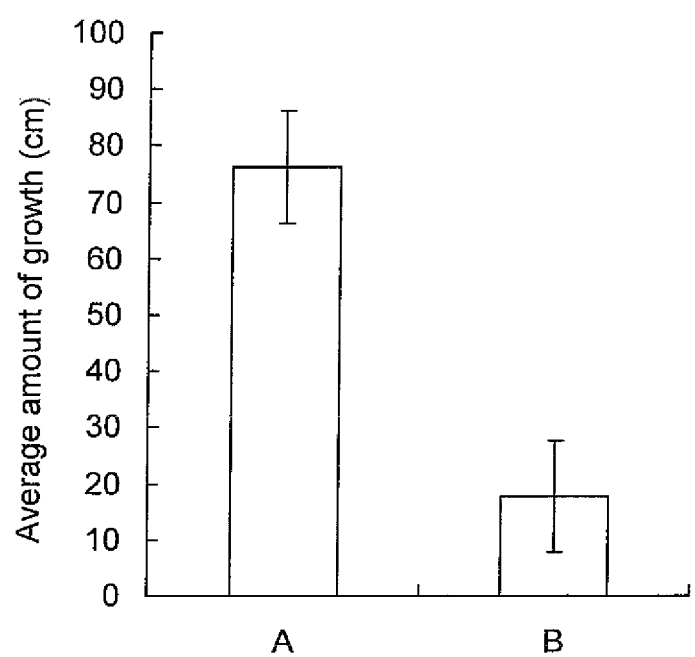
FIG. 5 is a diagram showing the amount of growth of each diagnostic pattern group of field-cultured *Eucalyptus globulus* on the third month of planting.

Groups 1 and 3 classified in Example 4 were tested for their growth statuses. The results are shown in FIG. 5. Specifically, the average amount of growth on the third month of planting (average of values determined by subtracting the height at the time of planting from the height on the third month) was measured for each group. As a result, group 1 diagnosed as having the favorable nitrogen status grew by 76 cm in terms of the average amount of growth and thus exhibited favorable future growth. On the other hand, group 3 diagnosed as having the poor nitrogen status on the first and second months of planting grew by 18 cm in terms of the average amount of growth and was thus demonstrated to have poor future growth.

These results agreed with the obtained correlation of a diagnosis result to the future growth status based on the diagnosis result in Examples 2 and 3. Specifically, it was demonstrated that according to the method of the present invention for diagnosing the nutritional status, the future growth statuses of *Eucalyptus* individuals can be predicted accurately without being influenced by stresses, even though the intended plants are cultured under different environmental conditions and placed under different stresses.

Example 6

Selection of Markers for Diagnosis of Nutritional Status of *Eucalyptus* of Another Species Markers for diagnosis of the nutritional status of *Eucalyptus deglupta×camaldulensis* (hereinafter, simply referred to as "*Eucalyptus* of another species" in Examples below for the sake of convenience), which is a hybrid of *Eucalyptus deglupta* and *Eucalyptus camaldulensis*, were selected with nitrogen as a particular nutrient by the method of the present invention for selecting a marker for diagnosis of the nutritional status.

1. Preparation of Nitrogen-Deficient *Eucalyptus* of Another Species 10 individuals of *Eucalyptus* of another species of approximately 30 to 50 cm in height were planted at 1 individual/pot in pots each containing 10 L of soil consisting of 4 L of mountain soil, 3 L of peat moss (FIBROSOIL), 2 L of vermiculite (Hattori Co., Ltd.), and 1 L of Venuslite (Fuyo Perlite Co., Ltd.) and cultured in a field environment for 1 month. During this period, the individuals were sprinkled twice a day (morning and evening) with approximately 500 ml of water per pot. These 10 individuals were divided into 2 groups each involving 5 individuals. 50 g (5 g/L soil) of High Control fertilizer (Chisso Asahi Fertilizer Co., Ltd.) was applied to group A. Group B was not fertilized.

2. Sampling of Leaves, Metabolite Extraction, and LC-MS Analysis

On the first month of planting, each *Eucalyptus* of another species was subjected to sampling of leaves, metabolite extraction, and LC-MS analysis in the same way as in Example 1.

3. Selection of Markers for Diagnosis of Nutritional Status of *Eucalyptus* of Another Species Biomarkers for diagnosis of the nutritional status of *Eucalyptus* of another species were selected as follows using GeneSpring MS (Agilent Technologies, Inc.).

(1) Two-group comparison (volcano plot) was performed between 5 individuals of *Eucalyptus* of another species cultured under conditions for group A and 5 individuals of *Euca-*

*lyptus* of another species cultured under conditions for group B to select, as marker candidates, metabolites that exhibited an accumulation differing by two or more times or by ½ or less between two test sections with a statistically significant difference (P<0.05).

(2) Common metabolites in both of the markers for nutritional diagnosis selected in Example 1 (Table 2: Mass Nos. 1 to 270) and the marker candidate metabolites selected in the preceding step (1) were selected as markers for diagnosis of the nutritional status of *Eucalyptus* of another species in relation to nitrogen.

4. Results

According to the method of the present invention for selecting a marker for diagnosis of the nutritional status, it was found that from among the markers for nutritional diagnosis selected in Example 1, 21 markers for diagnosis of the nutritional status of *Eucalyptus* of another species can be selected (Table 2; Mass Nos. 15, 31, 41, 42, 43, 51, 57, 59, 68, 84, 91, 104, 110, 111, 148, 149, 156, 241, 263, 264, and 269) through the marker selection process as described above.

Example 7

Diagnosis of Nitrogen Status of *Eucalyptus* of Another Species Using Markers for Diagnosis of Nitrogen Status of *Eucalyptus* of Another Species The nitrogen status of test *Eucalyptus* of another species was diagnosed using the markers for diagnosis of the nitrogen status of *Eucalyptus* of another species obtained in Example 6.

1. Culture of *Eucalyptus* of Another Species 15 individuals of *Eucalyptus* shoots of another species of approximately 40 cm in average height were planted at 1 individual/pot in pots each containing 10 L of soil consisting of 4 L of mountain soil, 3 L of peat moss (FIBROSOIL), 2 L of vermiculite (Hattori Co., Ltd.), and 1 L of Venuslite (Fuyo Perlite Co., Ltd.) and cultured in a field environment for 3 months. During this period, the shoots were sprinkled twice a day (morning and evening) with approximately 500 ml of water per pot. These 15 individuals were divided into 3 groups each involving 5 individuals. 50 g (5 g/L soil) of High Control fertilizer (Chisso Asahi Fertilizer Co., Ltd.) was added to group A. 50 g (5 g/L soil) of Long Max fertilizer (Kuki Fertilizer Ind. Co., Ltd.) was added to group B. Group C was not fertilized.

2. Sampling of Leaves, Metabolite Extraction, and LC-MS Analysis

On the first and second months of planting, each *Eucalyptus* of another species was subjected to sampling of leaves, metabolite extraction, and LC-MS analysis in the same way as in Example 1.

3. Diagnosis of Nitrogen Status Using Markers for Diagnosis of Nitrogen Status

On the first and second months of planting, each *Eucalyptus* of another species was subjected to data alignment of metabolites and analysis of the nitrogen status of *Eucalyptus* of another species using GeneSpring MS in the same way as in Example 1. Analysis conditions are as follows:

Calculation algorithm: Support Vector Machines
Kernel Function: Polynomial Dot Product (Order I)
Marker set: 21 markers for diagnosis of the nitrogen status of *Eucalyptus deglupta×camaldulensis* (Table 2; Mass Nos. 15, 31, 42, 43, 51, 57, 59, 68, 84, 91, 104, 110, 111, 148, 149, 156, 241, 263, 264, and 269)
Test Sample: 15 individuals of test *Eucalyptus deglupta× camaldulensis*

Training Sample: *Eucalyptus globulus* hydroponically cultured under each of 3 nutritional conditions in Example 1 (hydroponic medium I-cultured *Eucalyptus*, hydroponic medium II-cultured *Eucalyptus*, and hydroponic medium III-cultured *Eucalyptus*)

4. Results

The diagnosis results are shown in FIG. 6. The diagnostic patterns were classified into the following 3 groups.

Group 1: On both the first and second months of planting, 5 individuals were determined to have the same nitrogen status as that in the hydroponic solution I described in Example 1. All of these individuals were derived from group A, showing that most of the individuals in group A maintained the favorable nitrogen status on both the first and second months of planting.

Group 2: 5 individuals were determined to have the same nitrogen status as that in the hydroponic solution I described in Example 1 on the first month of planting, but have the same nitrogen status as that in the hydroponic solution III described in Example 1 on the second month of planting. All of these individuals were derived from group B, showing that the nitrogen status of this group was favorable at the beginning of planting, but deteriorated from about 1 month of planting. These results demonstrated that the amount of nitrogen in 50 g of Long Max fertilizer was also insufficient for raising *Eucalyptus* of another species for 2 months or longer in the preferable growth status.

Group 3: 5 individuals corresponded to this group, which were determined to have the same nitrogen status as that in the hydroponic solution III described in Example 1 on both the first and second months of planting. All of the individuals in this group had the poor nitrogen status from the beginning of planting and were derived from group C. Group C was deficient in nitrogen without being fertilized and was thus demonstrated to be consistent with the diagnosis result.

This Example produced a result similar to the diagnosis result of *Eucalyptus globulus* in Example 2. This result demonstrated that the nutritional diagnosis markers selected in Example 1 allow diagnosis of the nitrogen status of not only *Eucalyptus globulus* but also *Eucalyptus* of another species by selecting common markers in the *Eucalyptus* of another species and using the selected markers in the diagnosis.

Example 8

Relationship of Growth Status with Nitrogen Status Diagnosis Result Obtained Using Markers for Diagnosis of Nitrogen Status of *Eucalyptus* of Another Species Each group classified using the markers for diagnosis of the nitrogen status of *Eucalyptus* of another species in Example 7 was tested to verify whether or not its diagnosis result correlated to the future growth status based on the diagnosis result.

Figure 7:
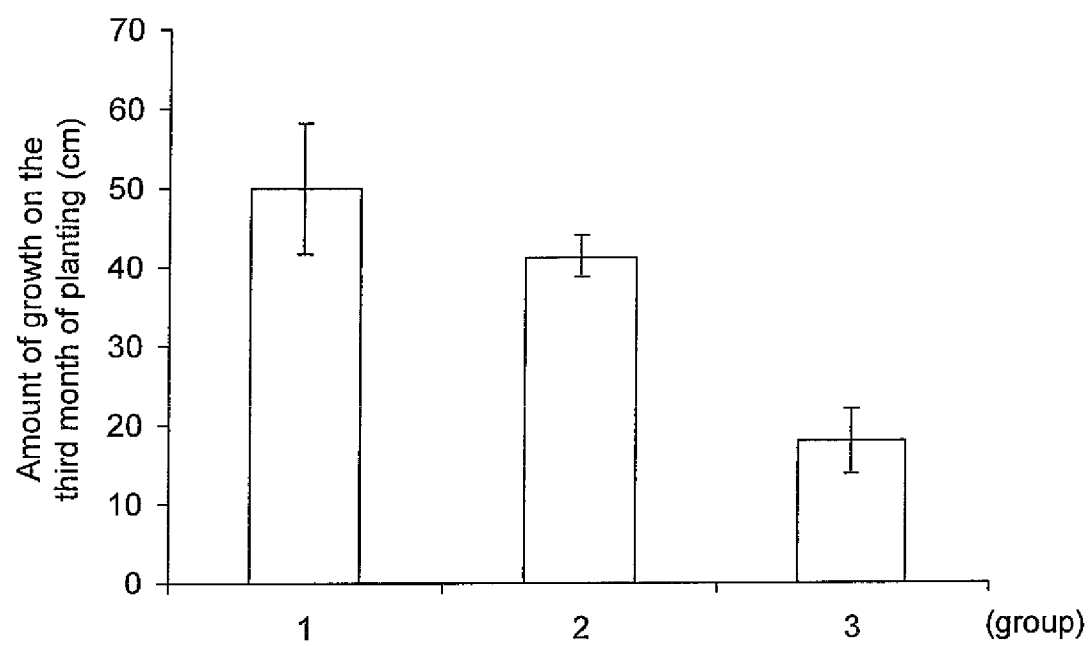
FIG. 7 is a diagram showing the amount of growth of each diagnostic pattern group of field-cultured *Eucalyptus deglupta×camaldulensis* on the third month of planting.

The results are shown in FIG. 7. Specifically, the average amount of growth on the third month of planting (average of values determined by subtracting the height at the time of planting from the height on the third month) was measured for each of groups 1 to 3 classified in Example 7. As a result, the average amount of growth was confirmed to be from highest to lowest in groups 1, 2, and 3 in this order. Specifically, group 1 diagnosed in Example 7 as having the favorable nitrogen status grew by 50 cm in terms of the average amount of growth and thus exhibited the most favorable future growth. Moreover, group 2 diagnosed in Example 7 as having the nitrogen status deteriorating from about 1 month of planting grew by 40 cm in terms of the average amount of growth and was thus slightly inferior in future growth to group 1. On the other hand, group 3 diagnosed in Example 7 as having the poor nitrogen status grew by 20 cm in terms of the average amount of growth and was thus demonstrated to have the poorest future growth.

These results showed that the diagnosis result obtained using the markers for diagnosis of the nitrogen status selected for *Eucalyptus* of another species in Example 6 correlated to the future growth, and demonstrated that the future growth status of a plant can be predicted using the markers for diagnosis of the nitrogen status selected for *Eucalyptus* of another species.

Example 9

Selection of Markers for Diagnosis of Nutritional Status for Various Plant Species Markers for diagnosis of the nutritional status for plant species other than the genus *Eucalyptus* were selected with nitrogen as a particular nutrient by the selection method of the present invention.

1. Preparation of Nitrogen-Deficient Plants

*Zea mays, Solanum melongena, Solanum lycopersicum,* and *Oryza sativa* were used as plant species other than *Eucalyptus*.

10 plant individuals of *Zea mays, Solanum melongena,* or *Solanum lycopersicum* of approximately 15 cm in height were planted at 1 individual of each plant species/pot in pots each containing 10 L of soil consisting of 4 L of mountain soil, 3 L of peat moss (FIBROSOIL), 2 L of vermiculite (Hattori Co., Ltd.), and 1 L of Venuslite (Fuyo Perlite Co., Ltd.) and cultured in a field environment. During this period, the individuals were sprinkled twice a day (morning and evening) with approximately 500 ml of water per pot. These 10 individuals were divided into 2 groups each involving 5 individuals. 50 g (5 g/L soil) of High Control fertilizer (Chisso Asahi Fertilizer Co., Ltd.) was applied to group A. Group B was not fertilized Alternatively, 10 individuals of *Oryza sativa* shoots of approximately 10 cm in height were planted at 1 individual/pot in pots each containing 10 L of soil consisting of 8 L of andosol (Hattori Co., Ltd.), 2 L of Akadama soil (Hattori Co., Ltd.), and 5 g of High Control fertilizer and cultured in a field environment for 1 month. These 10 individuals were divided into 2 groups each involving 5 individuals. 200 g (20.5 g/L soil) of High Control fertilizer was applied to group A. Group B was fertilized with only a fertilizer originally contained in the soil (initial fertilizer: 0.5 g/L soil).

2. Sampling of Leaves, Metabolite Extraction, and LC-MS Analysis

Each plant individual of *Solanum melongena, Solanum lycopersicum,* or *Zea mays* on the second week of planting and each plant individual of *Oryza sativa* on the fourth week of planting were subjected to sampling of leaves, metabolite extraction, and LC-MS analysis in the same way as in Example 1.

3. Selection of Markers for Diagnosis of Nutritional Status for Various Plant Species Biomarkers for diagnosis of the nutritional status were selected for each of the plant species (*Zea mays, Solanum melongena, Solanum lycopersicum,* and *Oryza sativa*) using GeneSpring MS (Agilent Technologies, Inc.).

(1) Two-group comparison (volcano plot) was performed between 5 plant individuals of each species cultured under conditions for group A and 5 plant individuals of each species cultured under conditions for group B to select, as marker candidates, metabolites that exhibited an accumulation differing by two or more times or by ½ or less between two test sections with a statistically significant difference (P<0.05).

(2) Common metabolites in both of the markers for nutritional diagnosis selected in Example 1 (Table 2: Mass Nos. 1 to 270) and the marker candidate metabolites selected in the preceding step (1) were selected as markers for diagnosis of the nutritional status for each plant species in relation to nitrogen.

4. Results

The markers for diagnosis of the nutritional status obtained by the method of the present invention for selecting a marker for diagnosis of the nutritional status are shown below for each plant species in relation to nitrogen.

5 markers for *Solanum melongena* (Table 2; Mass Nos. 104, 144, 242, 257, and 265)

3 markers for *Solanum lycopersicum* (Table 2; Mass Nos. 43, 246, and 265)

24 markers for *Zea mays* (Table 2; Mass Nos. 7, 17, 22, 29, 30, 35, 37, 48, 60, 65, 72, 76, 77, 88, 89, 92, 106, 140, 142, 148, 153, 154, 242, and 257)

3 markers for *Oryza sativa* (Mass Nos. 5, 170, and 173)

According to the method of the present invention for selecting a marker for diagnosis of the nutritional status, it was found that from among the markers for nutritional diagnosis selected in Example 1, markers for diagnosis of the nutritional status for species of a wide range of various plants can be selected, irrespective of genera or families and irrespective of monocotyledonous or dicotyledonous plants, as in the genus *Eucalyptus* (the family Myrtaceae) as well as the families Poaceae (*Zea mays* and *Oryza sativa*) and Solanaceae (*Solanum melongena* and *Solanum lycopersicum*).

Example 10

Diagnosis of Nitrogen Status of Other Plant Species Using Markers for Diagnosis of Nitrogen Status for Other Plant Species The markers for diagnosis of the nitrogen status of a plant of each species obtained in Example 9 were used to diagnose the nitrogen statuses of individuals as test samples.

1. Culture of Test Plant 15 individuals of shoots of each plant species (*Solanum melongena, Solanum lycopersicum,* or *Zea mays*) of approximately 15 cm in average height were planted at 1 individual/pot in pots each containing 10 L of soil consisting of 4 L of mountain soil, 3 L of peat moss (FIBROSOIL), 2 L of vermiculite (Hattori Co., Ltd.), and 1 L of Venuslite (Fuyo Perlite Co., Ltd.) and cultured in a field environment for 1 month. During this period, the individuals were sprinkled twice a day (morning and evening) with approximately 500 ml of water per pot. These 15 individuals were divided into 3 groups each involving 5 individuals. 50 g (5 g/L soil) of High Control fertilizer (Chisso Asahi Fertilizer Co., Ltd.) was added to group A. 50 g (5 g/L soil) of Long Max fertilizer (Kuki Fertilizer Ind. Co., Ltd.) was added to group B. Group C was not fertilized.

Alternatively, 10 individuals of *Oryza saliva* shoots of approximately 10 cm in height were planted at 1 individual/pot in pots each containing 10 L of soil consisting of 8 L of andosol (Hattori Co., Ltd.), 2 L of Akadama soil (Hattori Co., Ltd.), and 5 g of High Control fertilizer and cultured in a field environment for 1 month. These 10 individuals were divided into 2 groups each involving 5 individuals. 200 g (20.5 g/L soil) of High Control fertilizer was applied to group A. Group B was fertilized with only a fertilizer originally contained in the soil (initial fertilizer: 0.5 g/L soil).

2. Sampling of Leaves, Metabolite Extraction, and LC-MS Analysis

On the second week of planting, each plant individual was subjected to sampling of leaves, metabolite extraction, and LC-MS analysis in the same way as in Example 1.

3. Diagnosis of Nitrogen Status Using Markers for Diagnosis of Nitrogen Status

On the second week of planting, each test plant individual was subjected to data alignment of metabolites and analysis of test *Eucalyptus* using GeneSpring MS in the same way as in Example 1. However, only *Oryza sativa* was analyzed on the second and fourth weeks of planting.

Analysis conditions are as follows:

Calculation algorithm: Support Vector Machines

Kernel Function: Polynomial Dot Product (Order I)

Marker set: markers for diagnosis of the nitrogen status for each plant species

Markers for diagnosis of the nitrogen status of *Solanum melongena*: Mass Nos. 104, 144, 242, 257, and 265 in Table 2

Markers for diagnosis of the nitrogen status of *Solanum lycopersicum*: Mass Nos. 43, 246, and 265 in Table 2

Markers for diagnosis of the nitrogen status of *Zea mays*: Mass Nos. 7, 17, 22, 29, 30, 35, 37, 48, 60, 65, 72, 76, 77, 88, 89, 92, 106, 140, 142, 148, 153, 154, 242, and 257 in Table 2

Markers for diagnosis of the nitrogen status of *Oryza sativa*: Mass Nos. 5, 170, and 173 in Table 2

Test Sample: 15 test plant individuals for each species (*Solanum melongena, Solanum lycopersicum, Zea mays,* and *Oryza sativa*)

Fertilization Type (*Solanum melongena, Solanum lycopersicum,* and *Zea mays*):

A. High Control fertilizer (5 g/L soil)

B. Long Max fertilizer (5 g/L soil)

C. Not fertilized (*Oryza sativa*):

A. High Control fertilizer (20 g/L soil)

B. High Control fertilizer (5 g/L soil)

C. Initial fertilizer (0.5 g/L)

Training Sample *Eucalyptus globulus* hydroponically cultured under each of 3 nutritional conditions in Example 1 (hydroponic medium I-cultured *Eucalyptus*, hydroponic medium II-cultured *Eucalyptus*, and hydroponic medium III-cultured *Eucalyptus*)

4. Results

For each plant species, nutritional diagnosis was carried out on the second week of planting. Only for *Oryza sativa*, nutritional diagnosis was carried out on the second and fourth weeks of planting.

(*Solanum melongena*)

The results are shown in FIG. 8.

Fertilization types A and B: On the second week of planting, 10 out of the 10 individuals in total were determined to have the same nutritional status as the nitrogen status in the hydroponic solution I. This shows that the individuals in these fertilization methods maintained the favorable nitrogen status on the second week of planting.

Fertilization type C: 5 out of the 5 individuals in total were determined to have the same nutritional status as the nitrogen status in the hydroponic solution III. This shows that these 5 individuals had the insufficient nitrogen status. This is consistent with the result from the unfertilized group.

(*Solanum lycopersicum*)

The results are shown in FIG. 9.

Fertilization types A and B: On the second week of planting, 8 out of the 10 individuals in total were determined to have the same nutritional status as the nitrogen status in the hydroponic solution I. This shows that most of the individuals used in these fertilization methods maintained the favorable nitrogen status on the second week of planting.

Fertilization type C: 5 out of the 5 individuals in total were determined to have the same nutritional status as the nitrogen status in the hydroponic solution III. This shows that these 5 individuals had the insufficient nitrogen status. This is consistent with the result from the unfertilized group.

(*Zea mays*)

The results are shown in FIG. 10.

Fertilization types A and B: On the second week of planting, 9 out of the 10 individuals in total were determined to have the same nutritional status as the nitrogen status in the hydroponic solution I. This shows that most of the individuals used in these fertilization methods maintained the favorable nitrogen status on the second week of planting.

Fertilization type C: 5 out of the 5 individuals in total were determined to have the same nutritional status as the nitrogen status in the hydroponic solution III. This shows that these 5 individuals had the insufficient nitrogen status. This is consistent with the result from the unfertilized group.

(*Oryza sativa*)

The results are shown in FIG. 11.

Fertilization types A and B: On both the second and fourth weeks of planting, 10 out of the 10 individuals in total were determined to have the same nutritional status as the nitrogen status in the hydroponic solution I. This shows that these 10 individuals maintained the favorable nitrogen status on both the second and fourth weeks of planting.

Fertilization type C: On the second week of planting, 4 out of the 5 individuals in total were determined to have the same nutritional status as the nitrogen status in the hydroponic solution I. Thus, most of the individuals were determined to maintain the favorable nutritional status on the second week of planting. On the fourth week of planting, 4 out of the 5 individuals in total were determined to have the same nutritional status as the nitrogen status in the hydroponic solution III. This shows that the nitrogen status of fertilization type 3 was determined to be favorable on the second week of planting owing to the initial fertilizer (0.5 g/L soil) originally contained in the soil, but deteriorated on the fourth week of planting. These results demonstrated that the initial fertilizer (0.5 g/L soil) is not preferable for favorably raising *Oryza sativa* for 4 weeks.

The results of this Example demonstrated that the markers for diagnosis of the nitrogen status of the present invention selected in Example 1 are applicable to not only the genus *Eucalyptus* but also the other various plant species, and the nutritional status can be diagnosed using these markers.

Example 11

Relationship of Growth Status with Nitrogen Status Diagnosis Result Obtained Using Markers for Diagnosis of Nitrogen Status for Other Plant Species Each group diagnosed using the markers for diagnosis of the nitrogen status for other plant species in Example 10 was tested to verify whether or not its diagnosis result correlated to the future growth status based on the diagnosis result.

(*Solanum melongena*)

Figure 12:
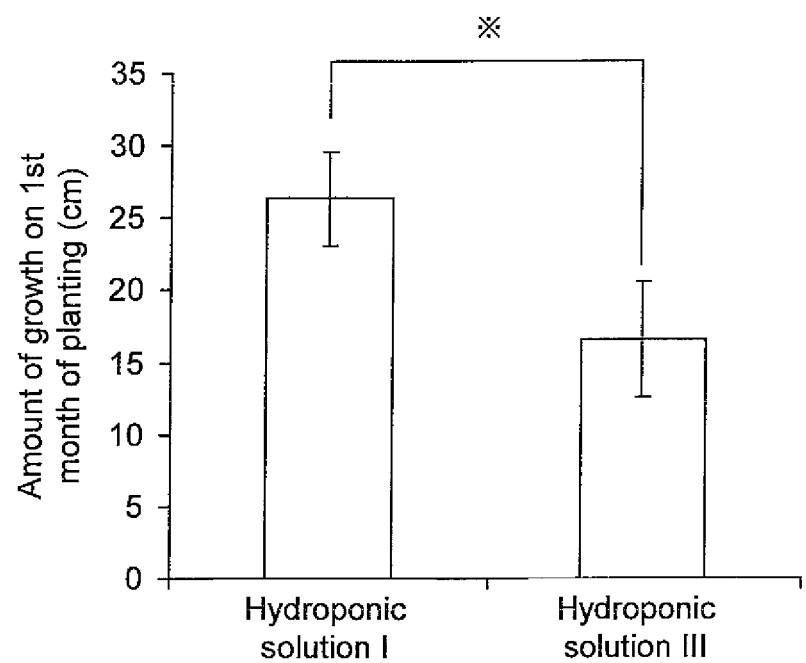
FIG. 12 is a diagram showing the amount of growth of each diagnostic pattern group of field-cultured *Solanum melon-*

The results are shown in FIG. 12. On the first month of planting, 10 individuals diagnosed as having the same nitrogen status as that in the hydroponic solution I were confirmed to grow by 26.4 cm in terms of the average amount of growth. On the other hand, 5 individuals diagnosed as having the same nitrogen status as that in the hydroponic solution III grew by 16.6 cm in terms of the average amount of growth. A significant difference was confirmed with 1% or less level between them.

(*Solanum lycopersicum*)

The results are shown in FIG. 13. On the first month of planting, 8 individuals diagnosed as having the same nitrogen status as that in the hydroponic solution I were confirmed to grow by 40.5 cm in terms of the average amount of growth. On the other hand, 7 individuals diagnosed as having the same nitrogen status as that in the hydroponic solution III grew by 26.4 cm in terms of the average amount of growth. A significant difference was confirmed with 1% or less level between them.

(*Zea mays*)

The results are shown in FIG. 14. On the first month of planting, 9 individuals diagnosed as having the same nitrogen status as that in the hydroponic solution I were confirmed to grow by 30.7 cm in terms of the average amount of growth. On the other hand, 6 individuals diagnosed as having the same nitrogen status as that in the hydroponic solution III grew by 11.3 cm in terms of the average amount of growth. A significant difference was confirmed with 1% or less level between them.

(*Oryza sativa*)

The results are shown in FIG. 15. On the sixth week of planting, 10 individuals diagnosed as having the same nitrogen status as that in the hydroponic solution I on both the second and fourth weeks of planting were confirmed to grow by 48.9 cm in terms of the average amount of growth. On the other hand, 4 individuals diagnosed as having the same nitrogen status as that in the hydroponic solution I on the second week of planting and as that in the hydroponic solution III on the fourth week of planting grew by 22 cm in terms of the average amount of growth. A significant difference was confirmed with 1% or less level between them.

The results of this Example demonstrated that the future growth statuses of a wide range of various plants can be predicted, irrespective of species and irrespective of monocotyledonous or dicotyledonous plants, by using the markers for diagnosis of the nitrogen status for various plant species selected in Example 9.

All publications, patents, and patent applications cited herein are incorporated herein by reference in their entirety.

The invention claimed is:

1. A method for selecting a marker for diagnosis of the nitrogen status of a *Eucalyptus* plant comprising:
   (1) extracting a first metabolite-containing extract from the whole or a portion of a *Eucalyptus* plant population grown in a first growth condition deficient in nitrogen and a second metabolite-containing extract from the whole or a portion of a *Eucalyptus* plant population grown in a second growth condition sufficiently provided with the nitrogen, wherein the *Eucalyptus* plant populations in the first and second growth conditions are the same species, and wherein the first and second growth conditions are identical except for the nitrogen;
   (2) comparing between the *Eucalyptus* plant populations in the first and second growth conditions the accumulation of metabolites present in the first and second metabolite-containing extracts, wherein the metabolites are presented in mass obtained by high-performance liquid chromatography-mass spectrometry using 4.6×250 mm of a column and 5 µm of particle; and
   (3) selecting a metabolite confirmed to have a statistically significant quantitative difference between the first metabolite-containing extract and the second metabolite-containing extract as the marker for diagnoses of the nitrogen status, wherein the statistically significant quantitative difference is obtained by using Student's t test.

2. The method according to claim 1, wherein the first growth condition deficient in the nitrogen is a depletion of the nitrogen.

3. A method for selecting a marker for diagnosis of the nutritional status of a *Eucalyptus* plant, comprising:
   (1) extracting a first metabolite-containing extract from the whole or a portion of a *Eucalyptus* plan population grown in a first growth condition deficient in the nitrogen and a second metabolite-containing extract from the whole or a portion of a *Eucalyptus* plant population grown in a second growth condition sufficiently provided with the nitrogen, wherein the *Eucalyptus* plant populations in the first and second growth conditions are the same species, and wherein the first and second growth conditions are identical except for the nitrogen;
   (2) comparing between the first and second metabolite-containing extracts the accumulation of metabolites present in the first and second metabolite-containing extracts, wherein the metabolites are presented in mass obtained by high-performance liquid chromatography-mass spectrometry using 4.6×250 mm of a column and 5 µm of particle;
   (3) selecting metabolites confirmed to have a statistically significant quantitative difference between the first metabolite-containing extract and the second metabolite-containing extract as first marker candidates, wherein the statistically significant quantitative difference is obtained by using Student's t test;
   (4) extracting a third metabolite-containing extract from the whole or a portion of a *Eucalyptus* plant population grown in a third condition deficient in the nitrogen, wherein the *Eucalyptus* plant population in this step is the same species as the *Eucalyptus* plant populations in the step (1), and wherein the amount of the nitrogen in the third growth condition differs from the amount of the nitrogen in the first condition in the step (1);
   (5) comparing the accumulation of metabolites present in the second and third metabolite-containing extracts, wherein the metabolites are presented in mass obtained by high-performance liquid chromatography-mass spectrometry using 4.6×250 mm if a column and 5 µm of particle;
   (6) selecting metabolites confirmed to have a statistically significant quantitative difference between the second metabolite-containing extract and the third metabolite-containing extract as second marker candidates, wherein the statistically significant quantitative difference is obtained by using Student's t test; and
   (7) selecting a metabolite selected both in the steps (3) and (6) as one of the first marker candidates and one of the second marker candidates as the marker for diagnosis of the nitrogen status.

4. The method according to claim 3, wherein the first growth condition deficient in the nitrogen in the step (1) is a depletion of the nitrogen.

5. The method according to claim 1, wherein the statistically significant quantitative difference is 1.3 times or more.

6. The method according to claim 3, wherein the statistically significant quantitative differences in the steps (3) and (6) are 1.3 times or more.

7. The method according to claim 1, wherein the metabolite selected in step (3) is at least one compound selected from the group consisting of a protein, plant hormone, polyphenol, sugar, amino acids and nucleotide.

8. The method according to claim 3, wherein the metabolite selected in step (7) is at least one compound selected from the group consisting of a protein, plant hormone, polyphenol, sugar, amino acids and nucleotide.

\* \* \* \* \*